US011200892B1

(12) United States Patent
Stoops et al.

(10) Patent No.: US 11,200,892 B1
(45) Date of Patent: Dec. 14, 2021

(54) SPEECH-ENABLED AUGMENTED REALITY USER INTERFACE

(71) Applicant: Amazon Technologies, Inc., Seattle, WA (US)

(72) Inventors: Brock Christopher Stoops, Seattle, WA (US); Sheng Bi, Bellevue, WA (US); Jay Reynolds, Seattle, WA (US); Benjamin King, Wilder, KY (US)

(73) Assignee: Amazon Technologies, Inc., Seattle, WA (US)

(*) Notice: Subject to any disclaimer, the term of this patent is extended or adjusted under 35 U.S.C. 154(b) by 151 days.

(21) Appl. No.: 16/214,726

(22) Filed: Dec. 10, 2018

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G06K 9/00577* (2013.01);
(Continued)

(58) Field of Classification Search
CPC ..... G10L 15/22; G10L 13/00; G10L 15/1815; G10L 15/30; G06F 3/167; G06F 3/0484;
(Continued)

(56) References Cited

U.S. PATENT DOCUMENTS

| 8,406,531 B2 | 3/2013 | Ramanujapuram et al. |
| 8,750,480 B2 * | 6/2014 | Davidson ............... H04W 4/00 379/201.05 |

(Continued)

FOREIGN PATENT DOCUMENTS

| CN | 101828191 A | 9/2010 |
| EP | 2863283 A1 | 4/2015 |

(Continued)

OTHER PUBLICATIONS

International Search Report and Written Opinion dated Oct. 27, 2016 in International Patent Application No. PCT/US2016/038636, 16 pages.

(Continued)

*Primary Examiner* — Md S Elahee
(74) *Attorney, Agent, or Firm* — Pierce Atwood LLP

(57) ABSTRACT

A speech interface device is configured to display an Augmented Reality (AR) user interface that displays information specific to a vehicle or other object. For example, the device may capture images of the vehicle and may displaying the AR user interface with labels, graphical elements, visual effects, and/or additional information superimposed above corresponding portions of the vehicle represented in the images. Using a remote system to perform speech processing, the device may respond to a voice command, enabling the AR user interface to display specific information about the vehicle and/or features of the vehicle in response to the voice command. The device may also send position data indicating information about what is displayed on the AR user interface, enabling the remote system to provide information about specific features or components based on where the device is pointed.

22 Claims, 28 Drawing Sheets

(51) Int. Cl.
*G10L 15/18* (2013.01)
*G10L 15/30* (2013.01)
*G06K 9/00* (2006.01)
*G06F 3/16* (2006.01)
*G10L 13/00* (2006.01)

(52) U.S. Cl.
CPC .......... *G10L 13/00* (2013.01); *G10L 15/1815* (2013.01); *G10L 15/30* (2013.01); *G10L 2015/223* (2013.01)

(58) Field of Classification Search
CPC .. G06F 3/04842; G06K 9/00577; B60K 35/00
USPC .............................. 379/201.05; 704/231, 257
See application file for complete search history.

(56) References Cited

U.S. PATENT DOCUMENTS

| | | | |
|---|---|---|---|
| 9,317,757 | B2 | 4/2016 | Winter et al. |
| 9,483,499 | B2 | 11/2016 | Ramanujapuram et al. |
| 9,665,596 | B2 | 5/2017 | Ramanujapuram et al. |
| 10,489,449 | B2* | 11/2019 | Barnes, Jr. ............ G06F 40/169 |
| 10,908,787 | B2* | 2/2021 | Cho ...................... G06F 3/0484 |
| 2003/0059088 | A1 | 3/2003 | Culp et al. |
| 2010/0214411 | A1 | 8/2010 | Weinmann et al. |
| 2011/0062229 | A1 | 3/2011 | Rhoads |
| 2012/0230540 | A1 | 9/2012 | Calman et al. |
| 2012/0258776 | A1 | 10/2012 | Lord et al. |
| 2013/0223744 | A1 | 8/2013 | Ramanujapuram et al. |
| 2013/0346189 | A1 | 12/2013 | Isaacs |
| 2014/0055553 | A1 | 2/2014 | Lee et al. |
| 2014/0056172 | A1 | 2/2014 | Lee et al. |
| 2015/0011194 | A1 | 1/2015 | Rodriguez |
| 2015/0149298 | A1 | 5/2015 | Tapley |
| 2015/0187351 | A1* | 7/2015 | Moon ..................... G10L 15/22 704/231 |
| 2015/0202962 | A1* | 7/2015 | Habashima ............ B60K 35/00 345/633 |
| 2016/0247015 | A1 | 8/2016 | Lee et al. |
| 2017/0024414 | A1 | 1/2017 | Ramanujapuram et al. |
| 2017/0169235 | A1 | 6/2017 | Schmelzer |
| 2017/0336926 | A1* | 11/2017 | Chaudhri ............ G06F 3/04842 |
| 2019/0325224 | A1* | 10/2019 | Lee ........................ G10L 15/22 |

FOREIGN PATENT DOCUMENTS

| | | |
|---|---|---|
| EP | 3314526 A1 | 5/2018 |
| JP | 2018527648 A | 9/2018 |
| WO | 2006011141 A2 | 2/2006 |
| WO | 2009026156 A1 | 2/2009 |
| WO | 2016209875 A1 | 12/2016 |

OTHER PUBLICATIONS

International Preliminary Report on Patentability dated Jan. 4, 2018 in International Patent Application No. PCT/US2016/038636, 10 pages.
Office Action dated Sep. 11, 2020 in European Patent Application No. 16738583.0, 5 pages.
Office Action dated Jun. 30, 2020 in Japanese Patent Application No. 2017-566361, 4 pages (including translation).
Office Action dated Dec. 3, 2020 in Chinese Patent Application No. 2016800361897, 14 pages (including translation).

* cited by examiner

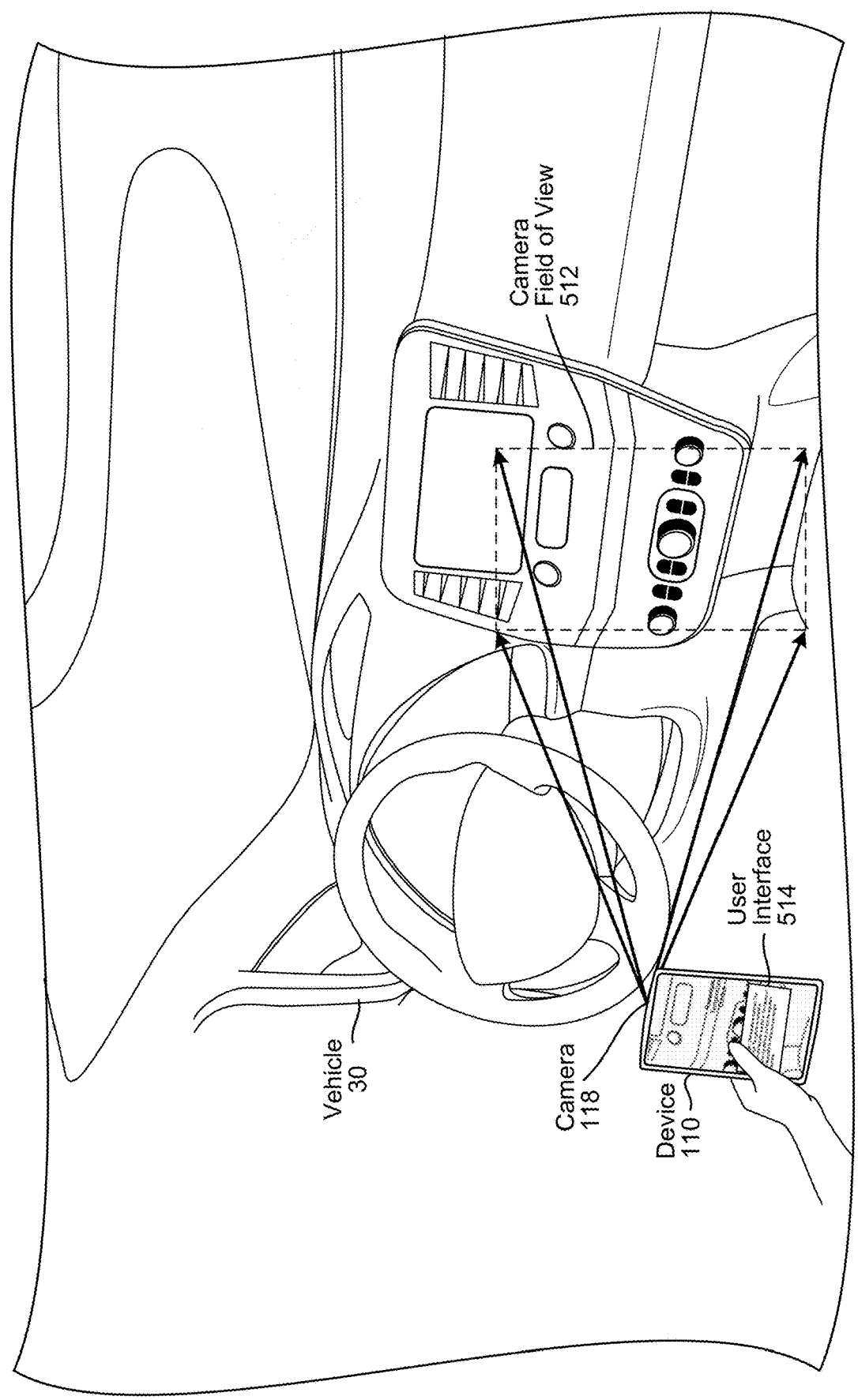

Labels 530

Original Image 520

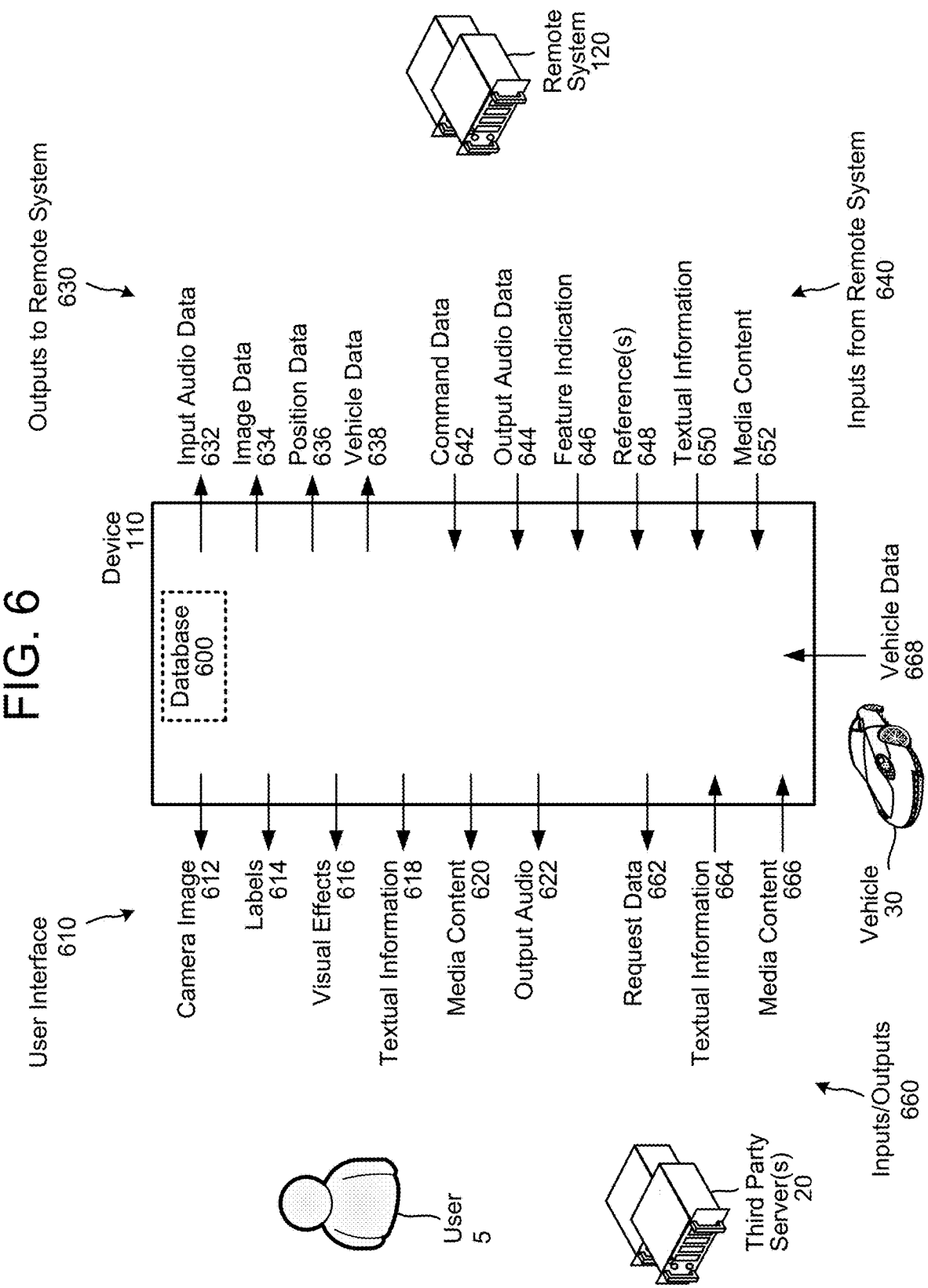

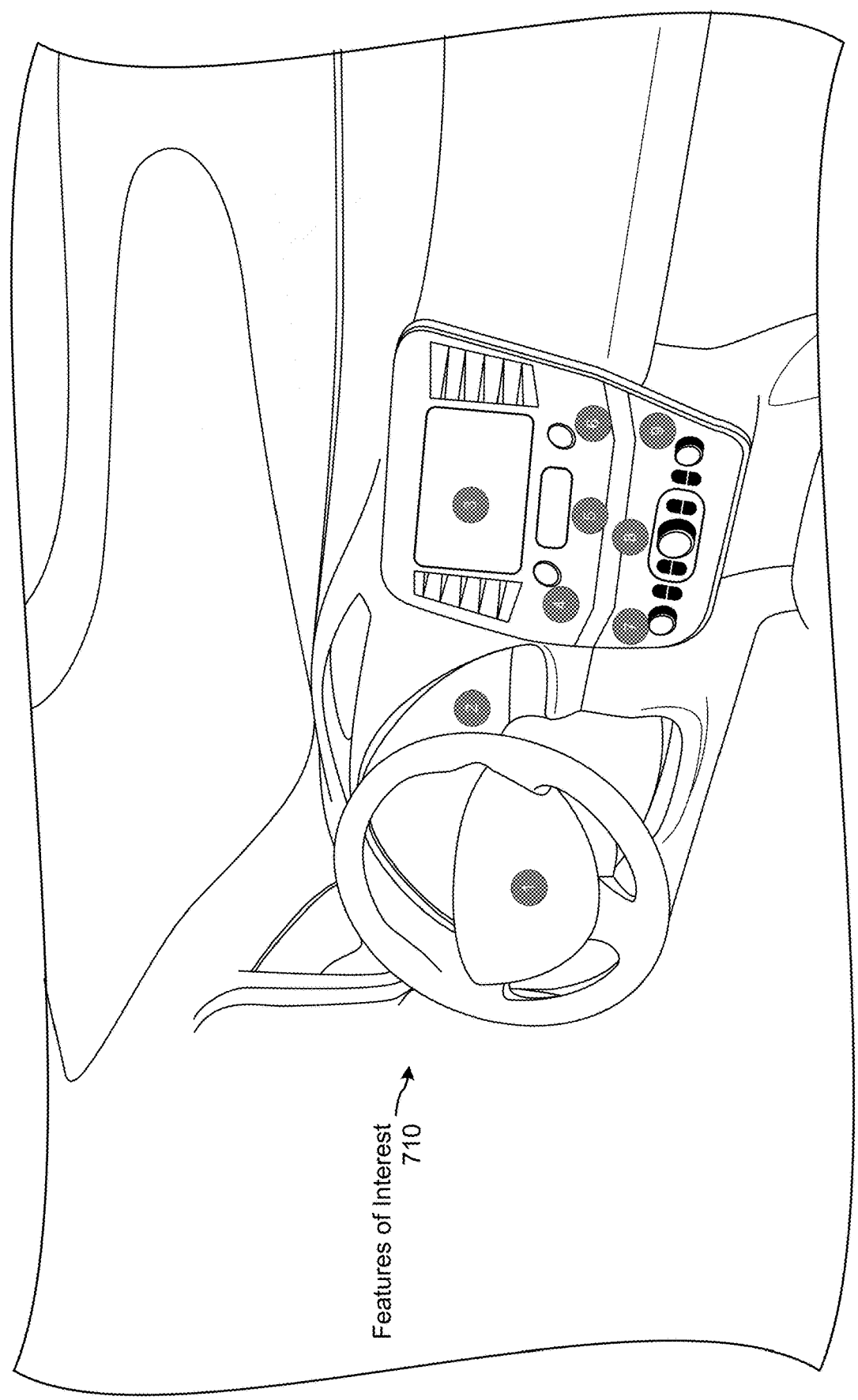

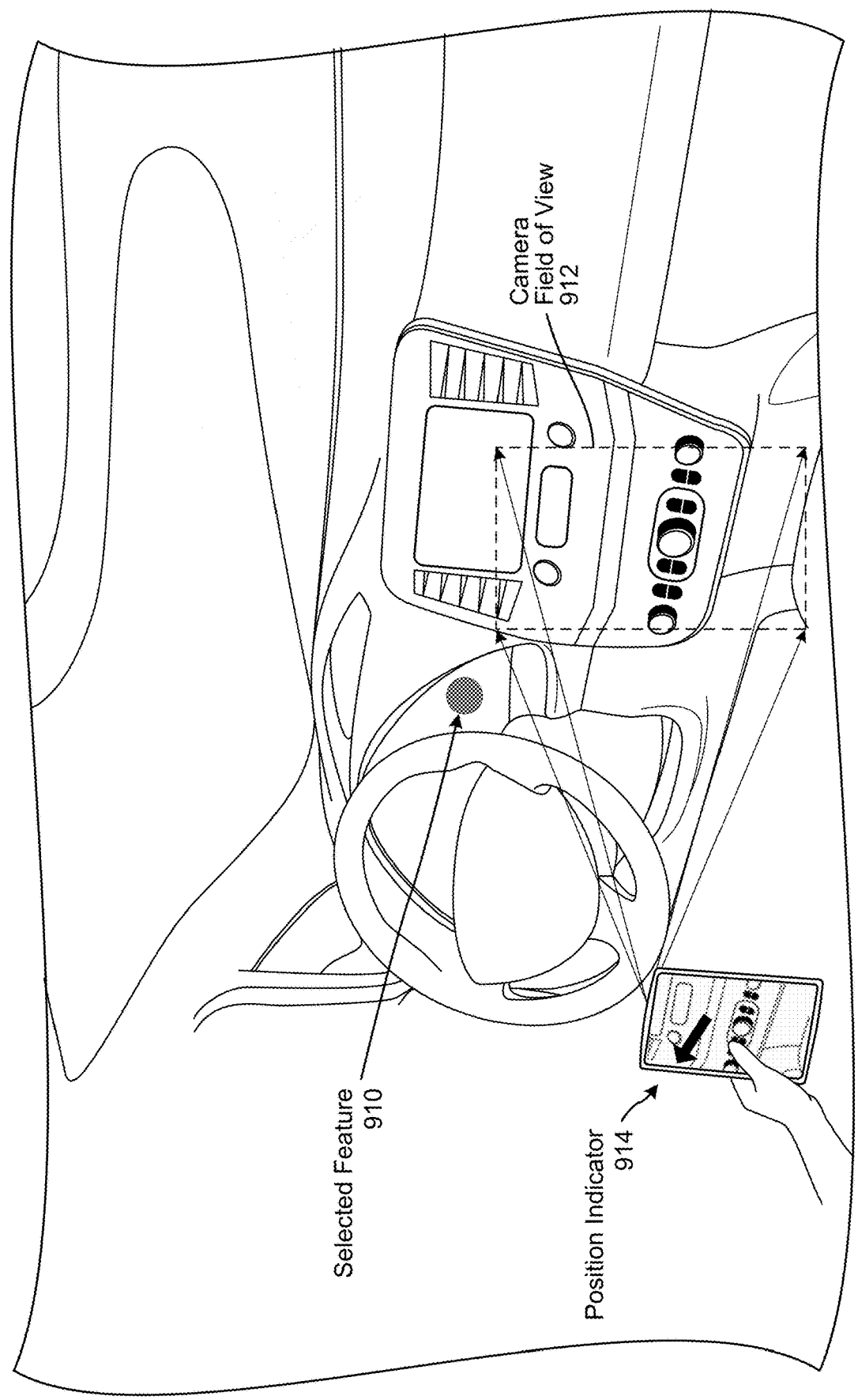

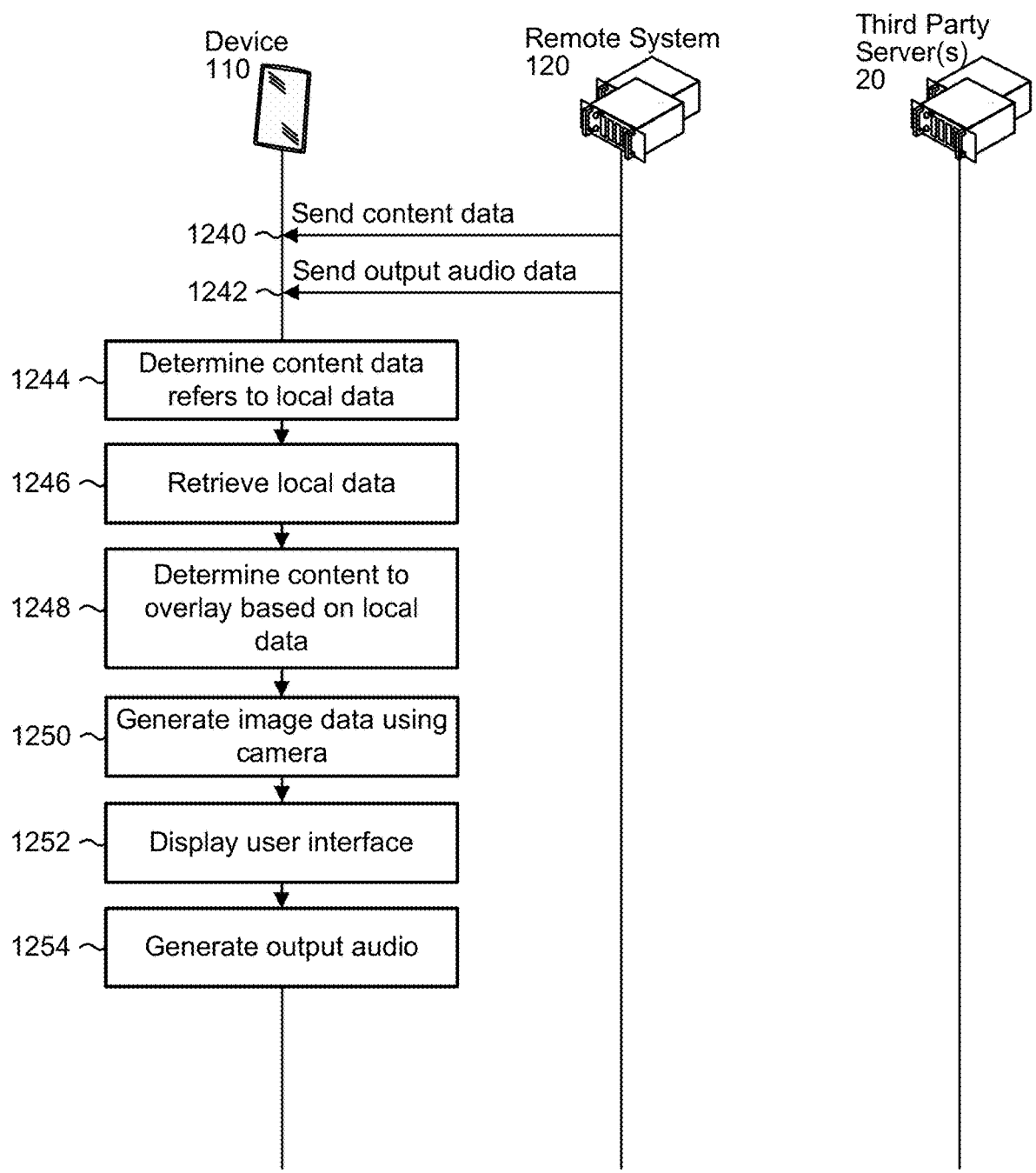

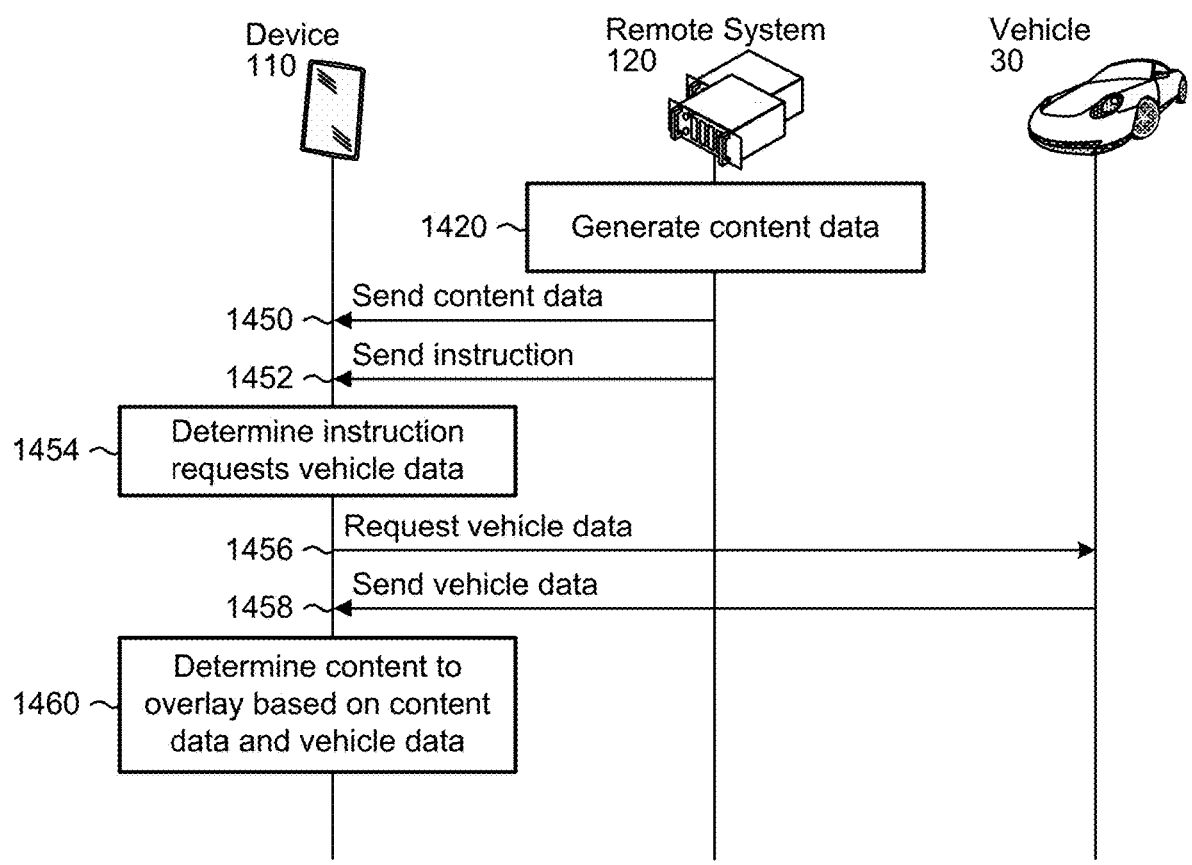

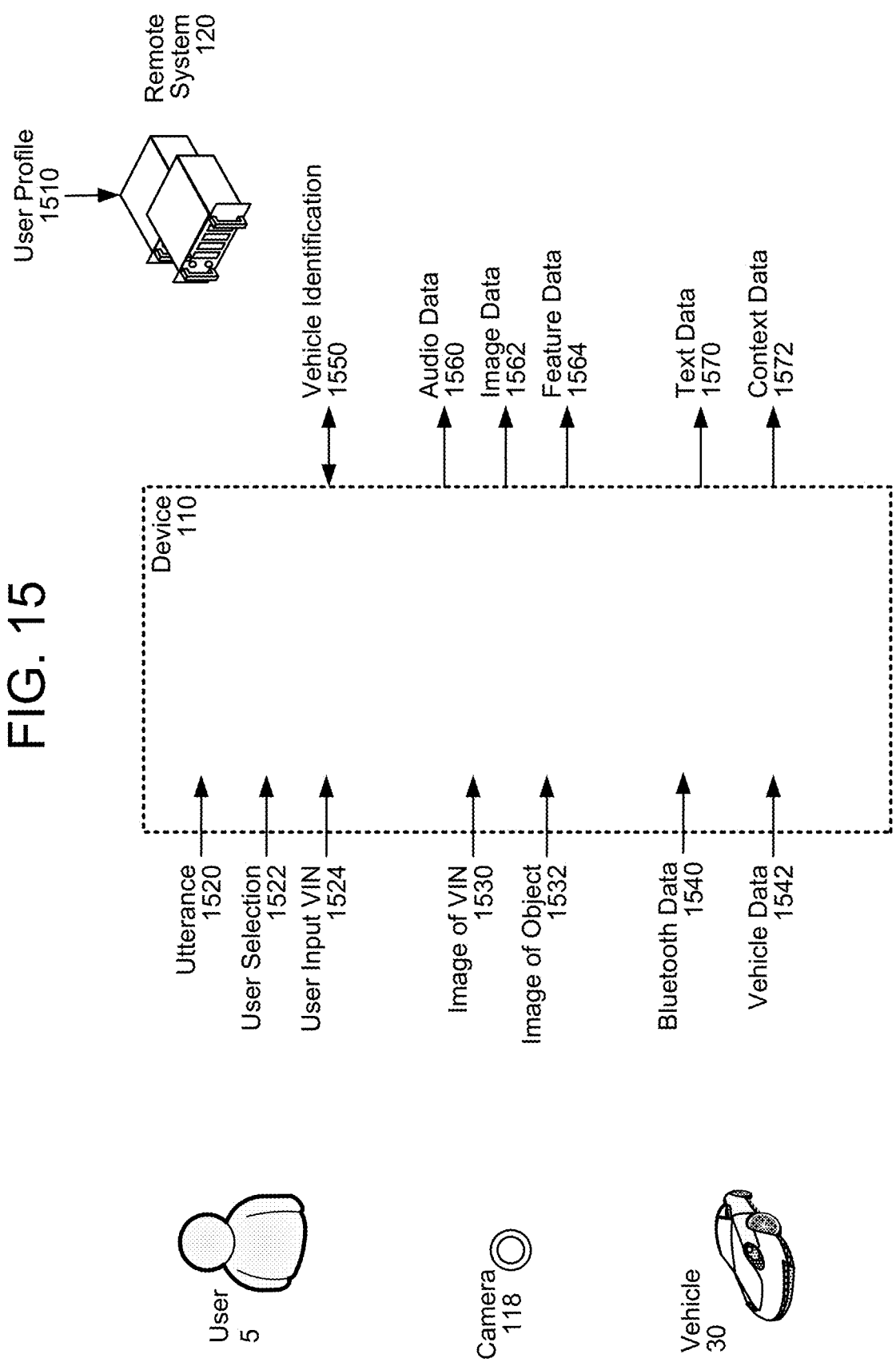

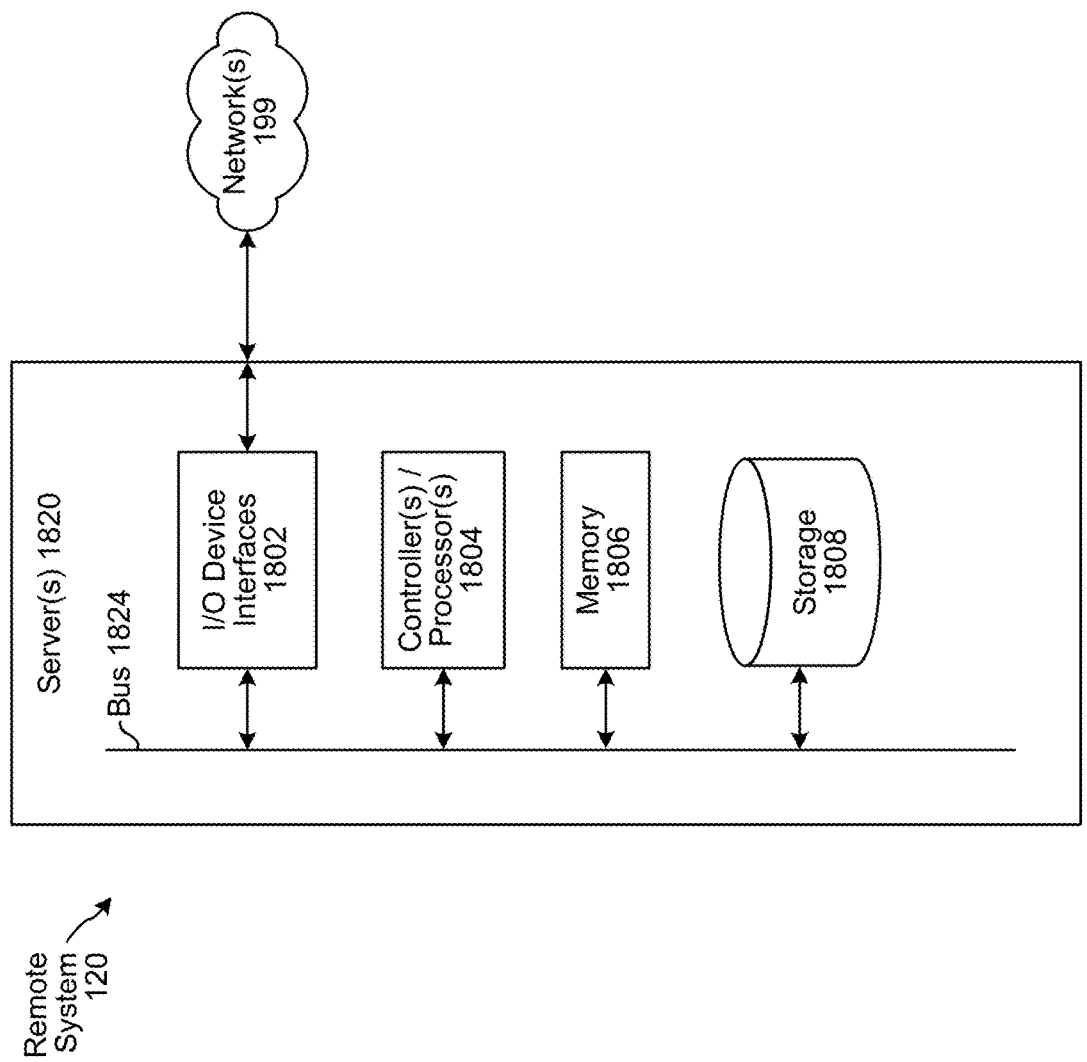

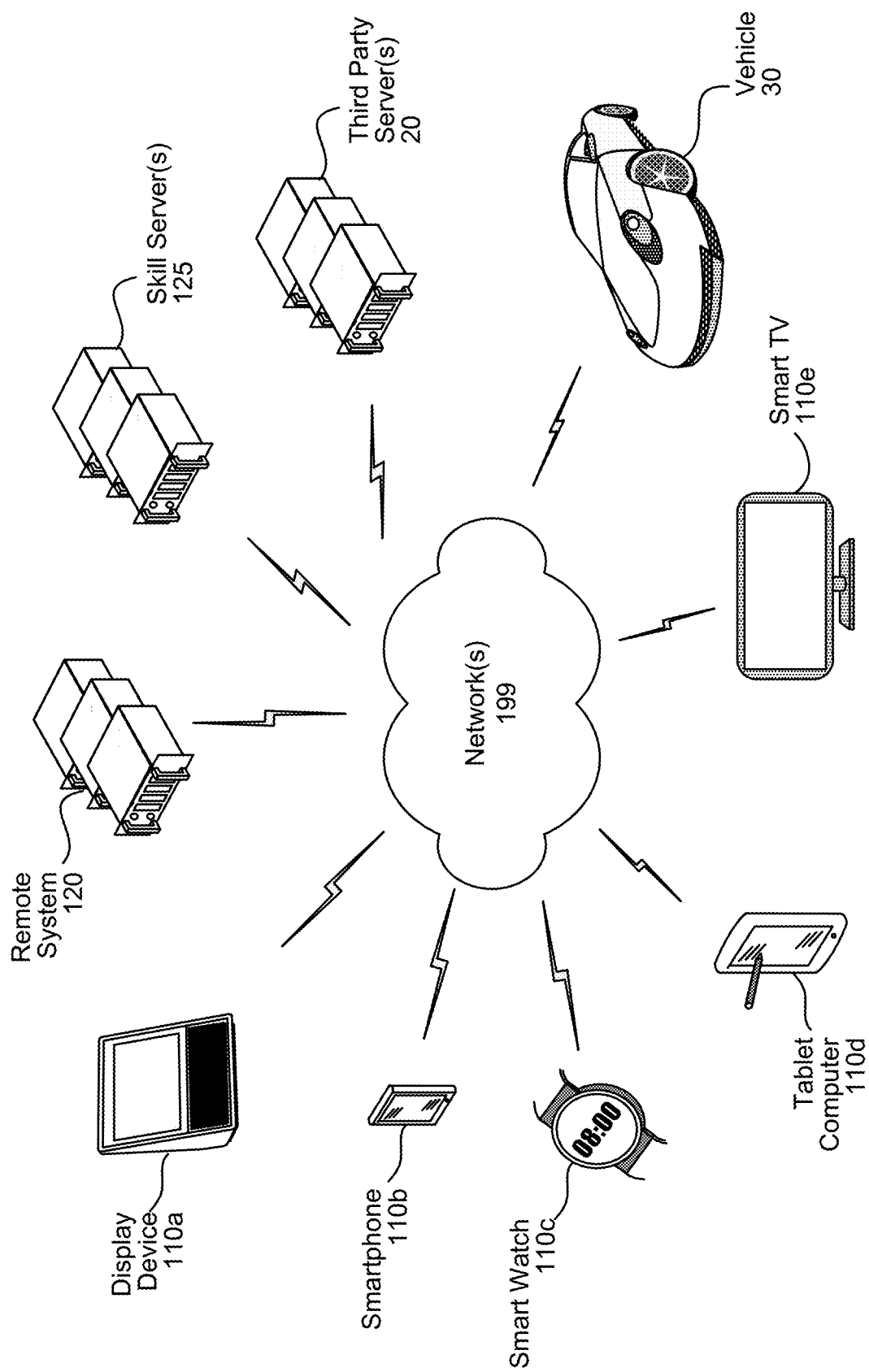

SPEECH-ENABLED AUGMENTED REALITY USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A-5G illustrate examples of user interfaces according to embodiments of the present disclosure.

FIG. 6 illustrates an example of inputs and outputs according to embodiments of the present disclosure.

FIG. 7 illustrates an example of emphasizing features of interest according to embodiments of the present disclosure.

FIG. 9 illustrates an example of highlighting a specific feature of interest according to embodiments of the present disclosure.

FIGS. 12A-12E are communication diagrams conceptually illustrating example methods for acquiring and displaying content according to embodiments of the present disclosure.

FIGS. 14A-14D are communication diagrams conceptually illustrating example methods for acquiring and displaying vehicle data according to embodiments of the present disclosure.

FIG. 15 illustrates an example of determining vehicle identification according to embodiments of the present disclosure.

FIG. 18 is a block diagram conceptually illustrating example components of a server according to embodiments of the present disclosure.

FIG. 19 illustrates an example of a computer network for use with the speech processing system.

DETAILED DESCRIPTION

Figure 1:
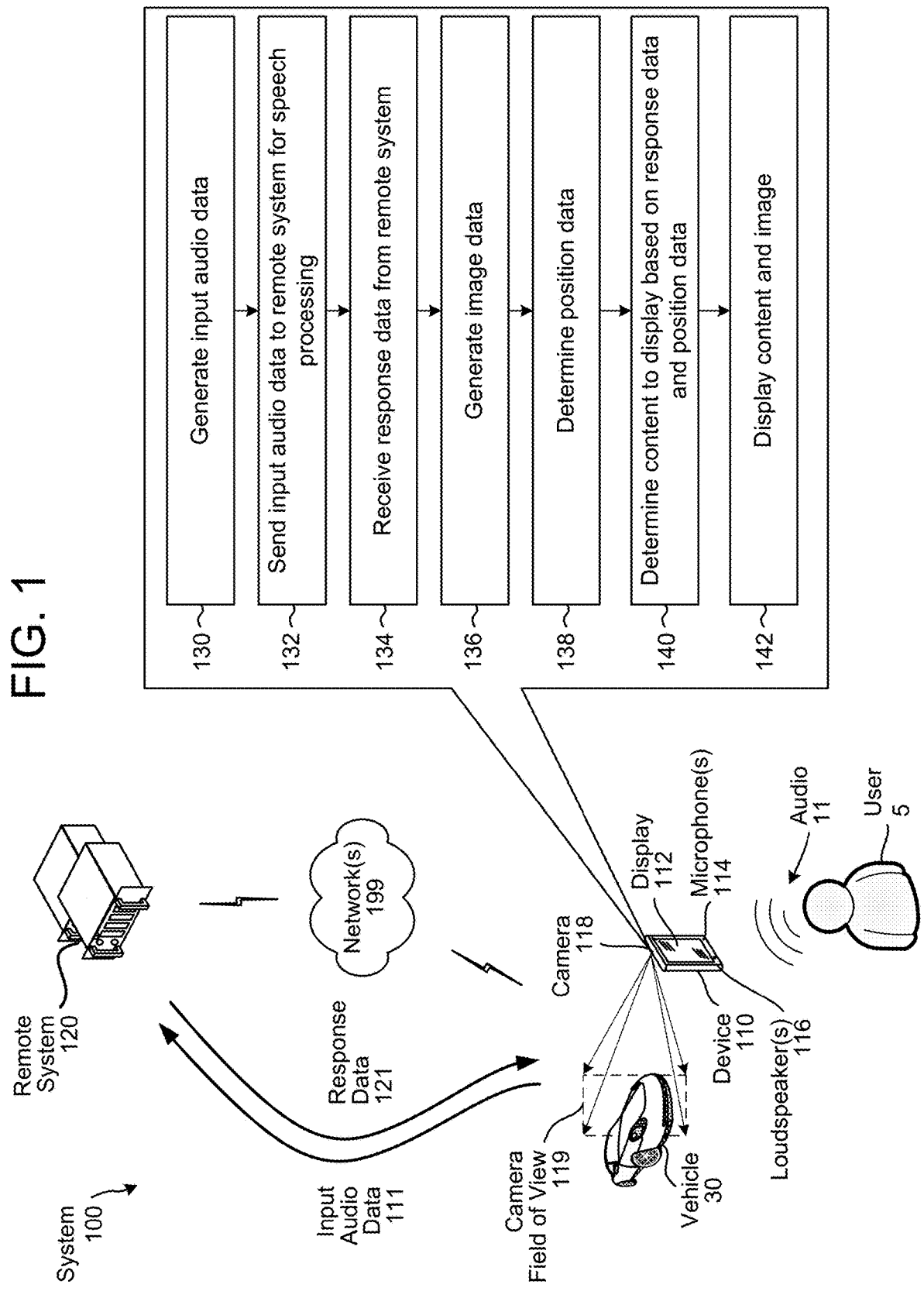
FIG. 1 illustrates a system configured to perform speech processing using a hybrid speech processing system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele.

A generalized speech processing system may be configured to perform many different actions such as outputting media, controlling home devices, making reservations, ordering products, obtaining reviews, playing games, etc. It is a non-trivial task to configure a system to accurately capture audio data for general utterances, be able to process the audio data to determine the user's intent, identify an appropriate executable action for that intent, and select the appropriate component for handling that action to ultimately correctly execute the user's intent and obtain the desired result.

Separately, an Augmented Reality (AR) user interface may capture images of a product or object and may display information about the product or object in proximity to, superimposed above, or otherwise visually connected to the images and/or otherwise referring to the product or object. For example, an AR user interface may capture images of a vehicle and display information about the vehicle and/or specific features of the vehicle. Conventional AR user interfaces are limited to certain inputs, such as inputs on a touchscreen or associated with other pointing devices.

To improve an AR user interface, devices, systems and methods are disclosed that extend a speech processing system to an AR user interface to provide specific information in response to a voice command. For example, a device may be configured to capture images and display the AR user interface associated with an object such as a vehicle. While displaying the AR user interface, the device may capture a voice command and send audio data representing the voice command to a remote system for speech processing. The remote system may interpret the voice command based on information specific to the object or vehicle and send content to the device to display on the AR user interface, enabling the user to control the AR user interface using voice commands. For example, the AR user interface enables the user to ask a general question about the vehicle, request additional information about a specific object or feature associated with the vehicle, and even request information about a feature or button represented on the AR user interface. The AR user interface may also display features unique to the vehicle, differences between a previous vehicle and a current vehicle, and/or contextual information to enable the user to locate a specific feature or component of the vehicle.

As illustrated in FIG. 1, disclosed is a system 100 for extending speech processing to an Augmented Reality (AR) user interface according to embodiments of the present disclosure. Although the figures and discussion illustrate certain operational steps of the system in a particular order, the steps described may be performed in a different order (as well as certain steps removed or added) without departing from the intent of the disclosure. A device 110 local to a user 5, one or more server(s) included in remote system 120, and one or more skill server(s) 125 may communicate across one or more networks 199. The skill server(s) 125 may each correspond to a particular skill 290 (described below) and may be capable of performing operations to ultimately execute an action.

To detect user speech or other audio 11, the device 110 may use one or more microphones(s) 114 to generate input audio data that captures the audio 11 in an environment (e.g., a room, a vehicle, etc.) in which the device 110 is located. For example, if the device 110 are located within earshot of a user 5, the device 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. In some examples, the device 110 may include a wakeword engine that processes the input audio data to detect a representation of a wakeword. When a wakeword is detected in the input audio data, the device 110 may generate input audio data 111 corresponding to the wakeword and send the input audio data 111 to the remote system 120 for speech processing. The remote system 120 may process the input audio data 111, determine the voice command, and perform one or more actions based on the voice command. For example, the remote system 120 may generate a command instructing the device 110 (or any other device) to perform an action, may generate output audio data corresponding to the action, may send response data 121 (including the output audio data and/or the command) to the device 110, and the device 110 may perform an action.

As illustrated in FIG. 1, the device 110 may include a display 112 (e.g., a touchscreen display, although the disclosure is not limited thereto), the microphone(s) 114, loudspeaker(s) 116, and a camera 118. Using the camera 118, the device 110 may capture image data representing an object (e.g., vehicle 30), which is illustrated in FIG. 1 as corresponding to a camera field of view 119. The device 110 may display the AR user interface on the display 112, with the AR user interface representing labels, graphical elements, visual effects, and/or the like on top of an image represented in the image data. Thus, the AR user interface may display information about the object at a corresponding position of the object.

As illustrated in FIG. 1, the device 110 may generate (130) input audio data, send (132) the input audio data to the remote system 120 for speech processing, and may receive (134) response data from the remote system 120. For example, the remote system 120 may interpret a voice command and generate the response data in response to the voice command, as discussed in greater detail below. In particular, the remote system 120 may interpret the voice command based on the object being displayed on the AR user interface, such as the vehicle 30 (or a feature associated with the vehicle 30), and/or the like. Thus, the remote system 120 may enable the device 110 to control the AR user interface based on a voice command.

The device 110 may generate (136) image data representing the object (e.g., vehicle 30), may determine (138) position data of the device 110, the camera 118, and/or the object, may determine (140) content to display based on the response data and the position data, and may display (142) the content and an image corresponding to the image data. For example, the device 110 may determine features of the vehicle 30 that are represented in the image data and may display labels and/or other information associated with the features at a corresponding position within the AR user interface.

Figure 2:
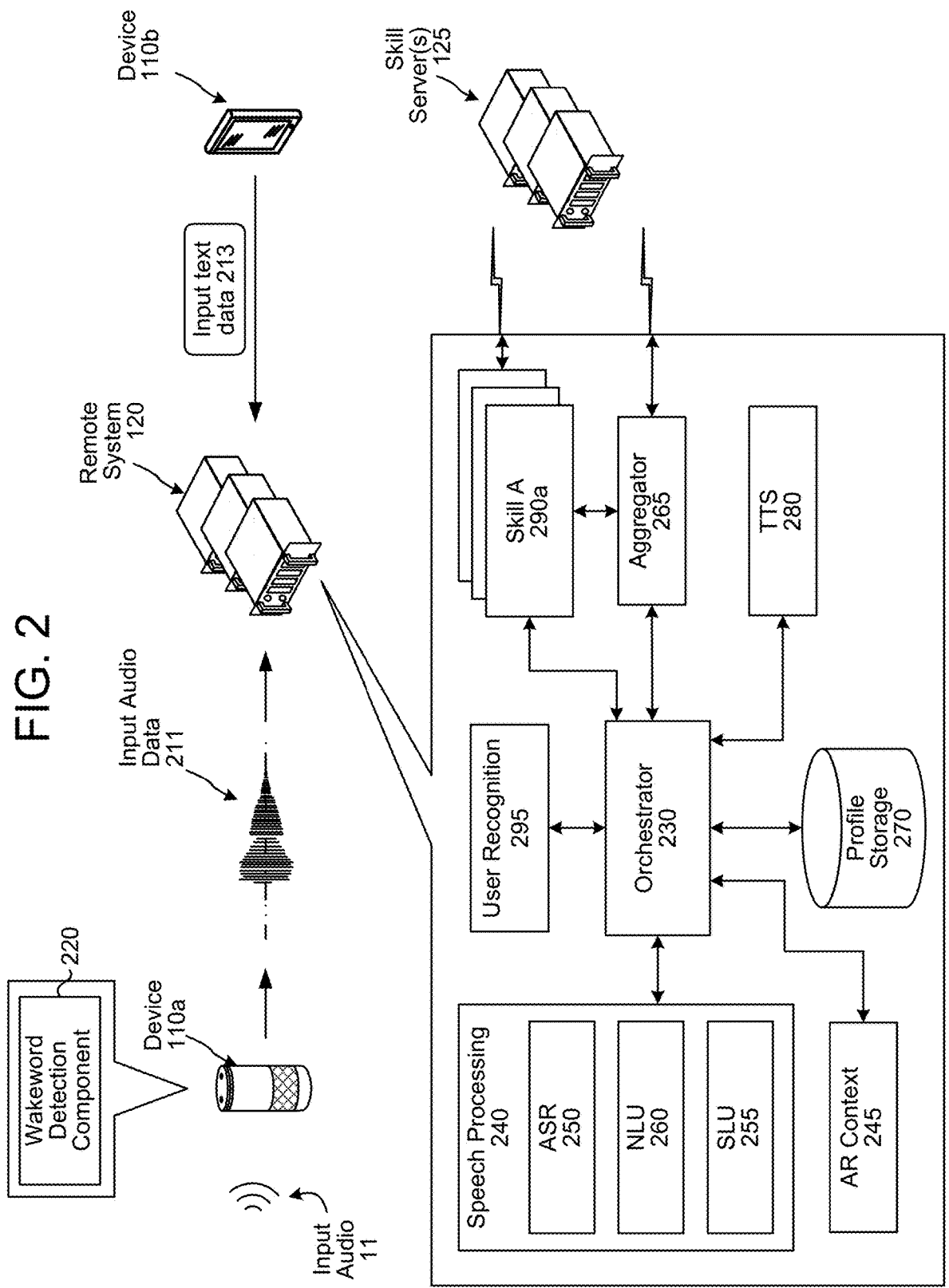
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the remote system 120. The remote system 120 receives the input audio data 211 from the device 110 and performs speech processing (such as ASR and NLU) on the input audio data to determine that the utterance includes a go-back request.

Alternatively, a device may receive input from the user 5 corresponding to text or a button press via a touch screen providing a virtual keyboard. The device may generate input text data corresponding to the input text. The device may send the input text data to the remote system 120 via an application operating on the device and in communication with the remote system 120.

A speech-capture device 110a (e.g., a device that is capable of detecting a user's speech and converting the audio 11 of the speech into audio data 211) may receive input audio 11, corresponding to a spoken utterance corresponding at least in part to a command, using an audio capture component, such as a microphone or array of microphones. The device 110, using a wakeword detection component 220, processes input audio data corresponding to the input audio 11 to determine if a keyword (e.g., a wakeword) is detected in the input audio data. Following detection of a wakeword, the device 110 sends input audio data 211, corresponding to the utterance, to the remote system 120.

Upon receipt by the remote system 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. In some examples, the speech processing component 240 may include an ASR component 250 and an NLU component 260 that are configured to process the input audio data 211 to generate NLU data. However, the disclosure is not limited thereto and in other examples, the speech processing component 240 may include a spoken language understanding (SLU) component 255 that is configured to process the input audio data 211 to generate the NLU data, as will be described in greater detail below with regard to FIGS. 5A-6B. Additionally or alternatively, the speech processing component 240 may include the ASR component 250, the NLU component 260 and/or the SLU component 255 without departing from the disclosure.

An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 260. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The orchestrator 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

Alternatively, a device (such as a mobile device) may send input text data to the remote system 120. Upon receipt by the remote system 120, the input text data may be sent to the orchestrator component 230. The orchestrator component 230 may send the input text data to the NLU component 260 for processing as if the input text data came from the ASR component 250.

The NLU component 260 attempts to make a semantic interpretation of the phrases or statements represented in the input text data input therein. That is, the NLU component 260 (as described in detail herein) determines one or more meanings associated with the phrases or statements represented in the input text data based on individual words represented in the input text data. The NLU component 260 determines an intent (e.g., an action that a user desires be performed) of a command represented in the input text data as well as pertinent pieces of information in the input text data that allow a device (e.g., the device 110, the remote system 120, the skill server(s) 125, etc.) to execute the intent. For example, if the input text data corresponds to "call mom," the NLU component 260 may determine a user intended to activate a telephone in his/her device and to initiate a call with a contact matching the entity "mom."

The remote system 120 may include an aggregator component 265 that receives NLU results data and determines (as described in detail herein) which skill(s) 290 and/or skill server(s) 125 to the system should call to execute an input command. The aggregator component 265 may be implemented separately from the orchestrator component 230 (as illustrated) or one or more components of the aggregator component 265 may be implemented as part of the orchestrator component 230.

When audio data of an utterance is received, ASR is performed to determine text corresponding to the audio data and NLU is performed to determine what intent/action is intended by the utterance. Depending on the NLU output data, an instruction is sent to a skill component or skill component for handling the action called for in the utterance.

A "skill" component may include software running on the remote system 120 that is akin to an application. That is, a skill 290 may enable the remote system 120 to execute specific functionality in order to provide data or produce some other output requested by a user. The remote system 120 may be configured with more than one skill 290. For example, a weather service skill may enable the remote system 120 to provide weather information, a car service skill may enable the remote system 120 to book a trip with respect to a taxi or ride sharing service, an order pizza skill may enable the remote system 120 to order a pizza with respect to a restaurant's online ordering system, etc. A skill component may include hardware, software, firmware, or the like that may be dedicated to the particular skill or shared among different components. The skill component may be part of the remote system 120 (for example as skill 290) or may be located at whole (or in part) with separate skill server(s) 125. Skill server(s) 125 may communicate with skills 290 within the remote system 120 and/or directly with the orchestrator 230 or with other components. For present purposes, unless expressly stated otherwise, reference to a skill or skill component (such as skill 290) may include a skill component operating within remote system 120 and/or skill operating within skill server(s) 125.

A skill 290 may be configured to perform one or more actions. That is, a skill component may execute specific functionality in order to provide data or produce some other output requested by a user. A particular skill component may be configured to execute more than one action. For example, a weather service skill involve a skill component providing weather information to the remote system 120, a car service skill may involve a skill component booking a trip with respect to a taxi or ride sharing service, an order pizza skill may involve a skill component ordering a pizza with respect to a restaurant's online ordering system, etc.

A skill(s) 290 and may be in communication with one or more skill servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a skill(s) 290 or a skill server(s) 125 may provide output text data responsive to the present user command. The remote system 120 may include a text-to-speech (TTS) component 280 that generates output audio data from skill(s) 290 and skill server(s) 125 provided output text data. The TTS component 280 may use different synthesis techniques. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The remote system 120 may include a user recognition component 295. The user recognition component 295 may take as input the input audio data 211 and/or input text data output by the ASR component 250 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by skills 290 and/or skill servers 125, routing by the action manager 275, or other functions.

The remote system 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preference data specific to the user associated therewith. That is, each user profile may include preference data unique from one or more other user profiles encompassed by the same customer profile. The preference data may include information indicating what preferences the user has with regard to certain skills or other information. A user profile may be a stand-alone profile or may be encompassed under a customer profile. A user profile may also include history data which may be data representative of previous interactions between the user of the user profile and the system. A user profile may incorporate information associating one device with another. For example, if a user has one speech-capture device (such as an Echo Dot) in the same room as a media playback device (such as a Fire TV), the user may indicate the two devices should be linked, thus allowing the system to more easily recognize spoken media playback commands received by the Echo Dot may be intended to cause media to playback on the Fire TV. Thus the system may store an association between the devices as part of the user's (or other) profile. This may result in the system linking multiple devices as one "virtual device" where the system may treat the linked devices as a single device for certain purposes. For example, multiple loudspeakers may be linked as a single audio output device for purposes of playing music through multiple speakers simultaneously (e.g., as part of a surround sound system). As another example, an Echo Dot and Fire TV may be linked for purposes of capturing audio commands that request video playback. As illustrated, the user profile storage 270 is implemented as part of the remote system 120. However, it should be appreciated that the user profile storage 270 may be located proximate to the remote system 120, or may otherwise be in communication with the remote system 120, for example over the network(s) 199. User profile data may be used to inform NLU processing as well as processing performed by skills 290.

The remote system 120 may include an Augmented Reality (AR) context component 245. The AR context component 245 may receive information from the device 110, via the orchestrator 230, indicating content being presented on a display of the device 110 when the input audio 11 is detected. The AR context component 245 may interpret this information to identify a portion of the vehicle 30 (e.g., objects, features, and/or the like) that is presented on the display or in proximity to what is presented on the display.

In some examples, the AR context component 245 may receive image data corresponding to the content being displayed, first position data (e.g., coordinates) corresponding to a location of the device 110 relative to the vehicle 30, second position data (e.g., labels, coordinates, and/or the like indicating a field of view of the camera 118) corresponding to the portion of the vehicle 30 being displayed, and/or other information, as will be described in greater detail below with regard to FIGS. 10A-10B. As will be discussed in greater detail below, the second position data may correspond to coordinates of the camera field of view, a plurality of labels associated with the camera field of view (e.g., all labels included within the camera field of view), specific labels associated with the camera field of view (e.g., labels associated with a perimeter of the camera field of view), a single label associated with the camera field of view (e.g., a label closest to a center of the camera field of view), and/or the like without departing from the disclosure.

Using the information received from the device 110, the AR context component 245 may estimate which buttons/components are represented by the user interface, as discussed in greater detail below with regard to FIGS. 11 and 12B. For example, the AR context component 245 may determine objects, components, features, and/or the like that are either included in or in proximity to the portion of the vehicle 30 being displayed. In some examples, the AR context component 245 may determine label data indicating labels of the objects/features associated with the field of view of the camera 118, although the disclosure is not limited thereto. The AR context component 245 may generate context data indicating the objects/features associated with the field of view, the label data associated with the objects/features, entities associated with the objects/features, and/or the like, which may be sent to the speech processing component 240 to interpret the input audio data 211.

Thus, the remote system 120 may use the context data to interpret the voice command. For example, the remote system 120 may process the input audio data 211 to determine that the voice command corresponds to a query (e.g., "What button is this?") and may interpret the context data to respond to the query (e.g., determine which button is represented in the user interface based on position data received from the device 110). The speech processing component 240 may use the context data in a variety of ways, such as selecting a domain, determining entity data indicating a plurality of entities associated with the portion of the vehicle 30 being displayed, fill slots with individual entities selected from the entity data, re-rank results based on the entity data, select between different NLU hypotheses, and/or the like without departing from the disclosure.

Figure 3:
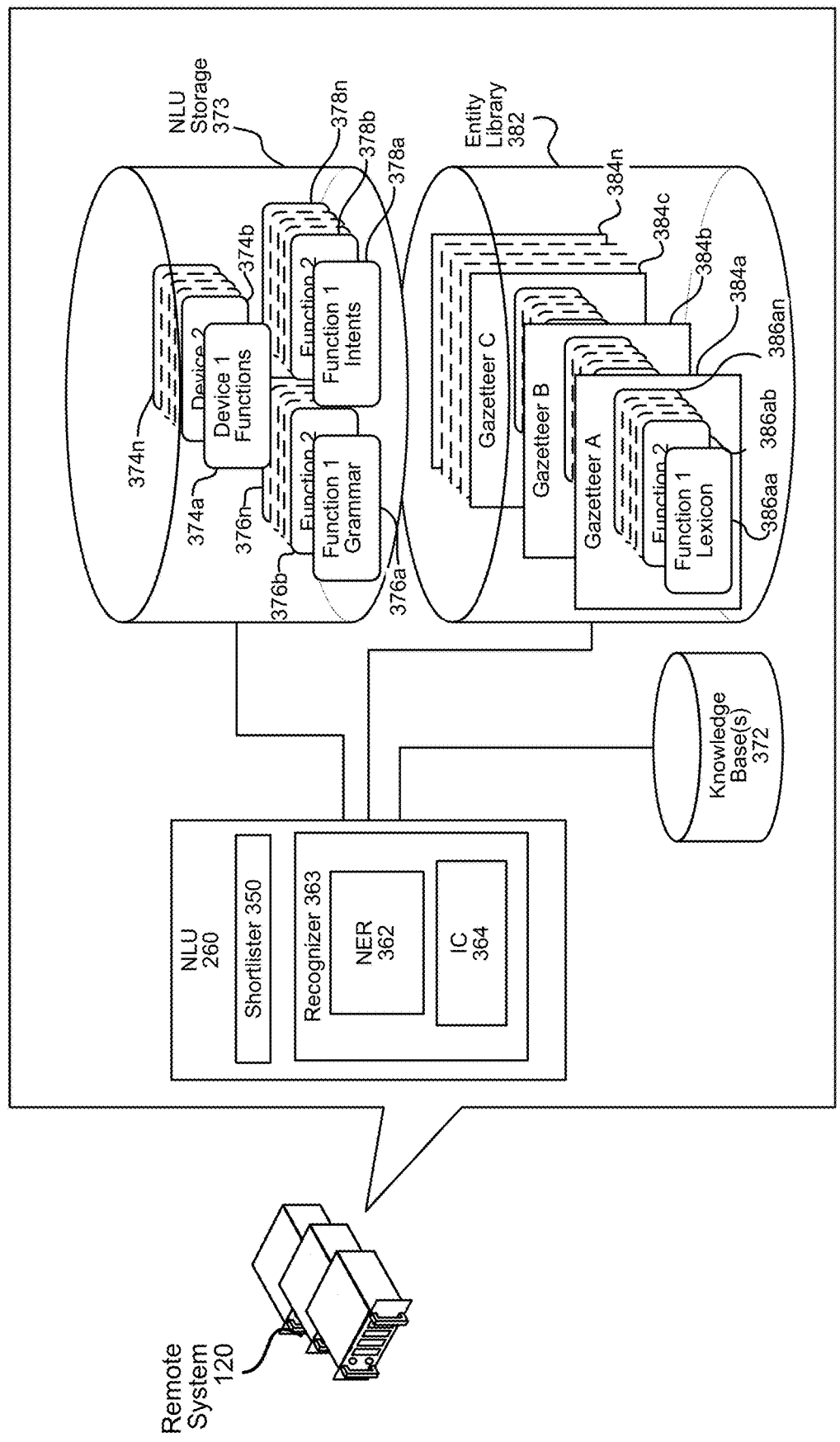
FIG. 3 is a conceptual diagram of how natural language processing is performed according to embodiments of the present disclosure.

FIG. 3 illustrates how NLU processing is performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., device 110a, device 110b, remote system 120, skill(s) 290, skill server(s) 125) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU e component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 350. The shortlister component 350 selects applications that may execute with respect to text data 410 input to the NLU component (e.g., applications that may execute the command). The shortlister component 350 thus limits downstream, more resource intensive NLU processes to being performed with respect to applications that may execute the command.

Without a shortlister component 350, the NLU component 260 may process a given hypothesis with respect to every application of the system, either in parallel, in series, or using some combination thereof. By implementing a shortlister component 350, the NLU component 260 may process a given hypothesis with respect to only the applications that may execute the command. This reduces total compute power and latency attributed to NLU processing.

The NLU component 260 may include one or more recognizers 363. Each recognizer 363 may be associated with a different "function" or "content source" (e.g., a different skill 290 or skill). The NLU component 260 may determine a function potentially associated with the command represented in text data input thereto in order to determine the proper recognizer 363 to process the hypothesis. The NLU component 260 may determine a command represented in text data is potentially associated with more than one function. Multiple recognizers 363 may be functionally linked (e.g., a telephony/communications recognizer and a calendaring recognizer may utilize data from the same contact list).

If the shortlister component 350 determines text corresponding to a hypothesis is potentially associated with multiple skills 290, the recognizers 363 associated with the skills 290 (e.g., the recognizers 363 associated with the applications in the subset selected by the shortlister 350) may process the text. The selected recognizers 363 may process the text in parallel, in series, partially in parallel, etc. For example, if text corresponding to a hypothesis potentially implicates both a communications application and a music application, a recognizer associated with the communications application may process the text in parallel, or partially in parallel, with a recognizer associated with the music application processing the text. The output generated by each recognizer 363 may be scored, with the overall highest scored output from all recognizers 363 ordinarily being selected to be the correct result.

If the NLU component 260 determines a command represented in text data is potentially associated with multiple functions, the recognizers 363 associated with the functions may each process the text data in parallel. For example, if a command potentially implicates both a communications function and a music function, a recognizer associated with the communications function may process the text data in parallel, or substantially in parallel, with a recognizer associated with the music function processing the text data. The output generated by each recognizer may be scored to indicate the respective recognizers confidence in its processing of the text data.

The NLU component 260 may communicate with various storages to determine the potential function(s) associated with a command represented in text data. The NLU component 260 may communicate with an NLU storage 373, which includes databases of devices (374a-374n) identifying functions associated with specific devices. For example, the device 110a may be associated with functions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a command represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include function-indexed lexical information associated with a particular user and/or device. For example, the Gazetteer A (384a) includes function-indexed lexical information 386aa to 386an. A user's music function lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the function (associated with the recognizer 363 implementing the NER component 362) to determine a mention one or more entities in text data input thereto. In this manner, the NER component 362 identifies "slots" (i.e., particular words in text data) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in text about the particular function to which the grammar model 376 relates, whereas the lexical information 386 is personalized to the user(s) and/or the device 110 from which the input audio data 211 or input text data 213 originated. For example, a grammar model 376 associated with a shopping function may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 363 may also include an intent classification (IC) component 364. The IC component 364 parses an text data to determine an intent(s) of the function associated with the recognizer 363 that potentially corresponds to the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words in the text data to the words and phrases in an intents database 378 associated with the function that is associated with the recognizer 363 implementing the IC component 364.

The intents identifiable by a specific IC component 364 are linked to function-specific (i.e., the function associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the function associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music function recognizer 363 may parse and tag text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music function, which an IC component 364 (also implemented by the music function recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search the database of generic words associated with the function (in the knowledge base 372). For example, if the text data including text corresponding to "play songs by the rolling stones," after failing to determine an album name or song name called "songs" by "the rolling stones," the NER component 362 may search the function's vocabulary for the word "songs." In the alternative, generic words may be checked before the gazetteer information, or both may be tried, potentially producing two different results.

The NLU component 260 may tag text to attribute meaning to the text. For example, the NLU component 260 may tag "play mother's little helper by the rolling stones" as: {intent} <PlayMusic>, {artist name} rolling stones, {media type} SONG, and {song title} mother's little helper. For further example, the NLU component 260 may tag "play songs by the rolling stones" as: {intent}<PlayMusic>, {artist name} rolling stones, and {media type} SONG.

Figure 4:
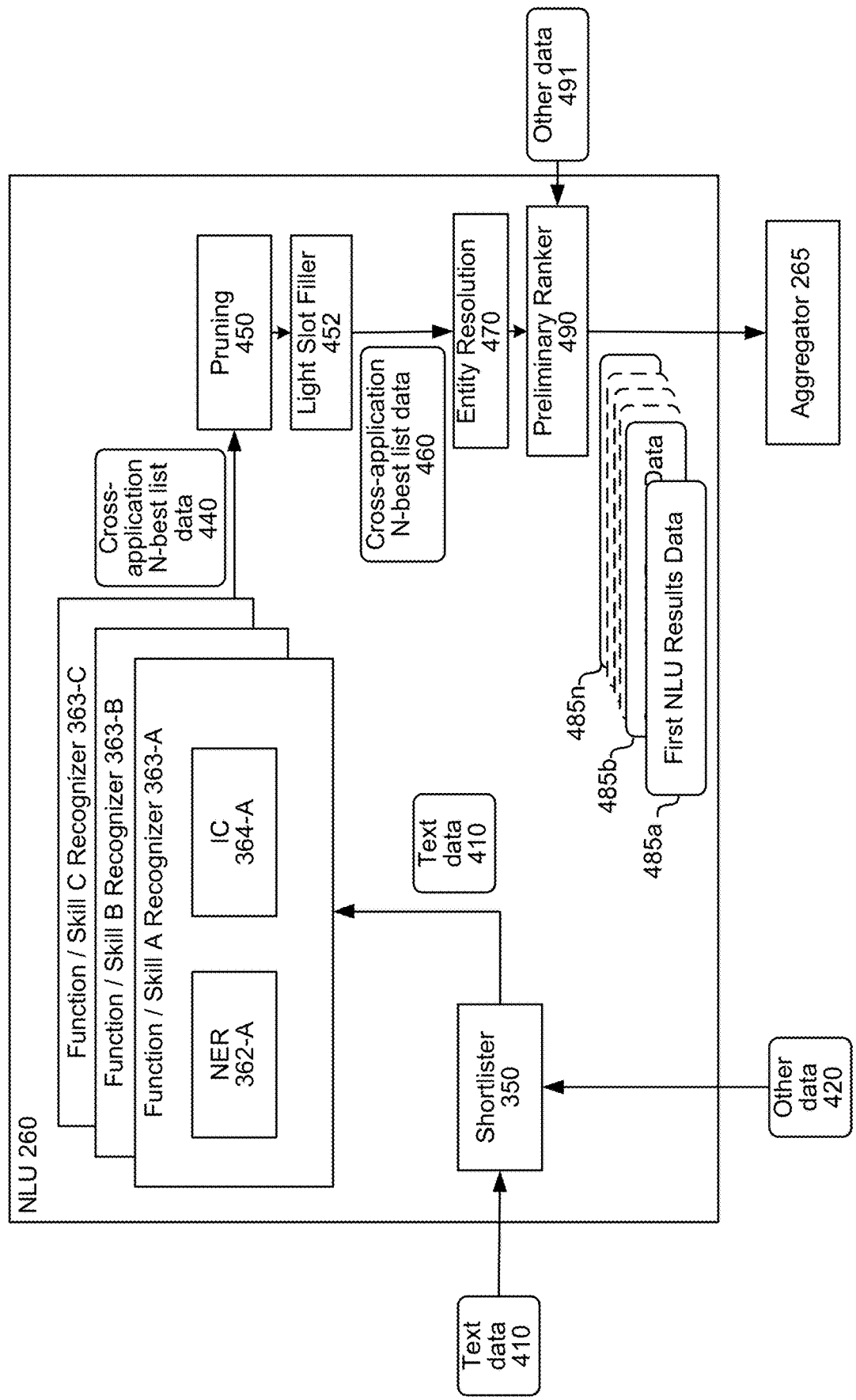
FIG. 4 is a conceptual diagram of how natural language processing is performed according to embodiments of the present disclosure.

The shortlister component 350 may receive text data 410 output from the ASR component 250 (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 350 to operate on the text. For example, an embedding of the text data 410 may be a vector representation of the text data.

The shortlister component 350 may make binary determinations (e.g., yes or no) regarding which skill(s) 290 relate to the text data 410. The shortlister component 350 may make such determinations using the one or more trained models described herein above. If the shortlister component 350 implements a single trained model for each skill 290, the shortlister component 350 may simply run the models that are associated with enabled applications as indicated in a profile (e.g., profile 502) associated with the device 110 and/or user that originated the command.

The shortlister component 350 may generate N-best list data representing applications that may execute with respect to the command represented in the text data 410. The size of the N-best list represented in the N-best list data is configurable. In an example, the N-best list data may indicate every application of the system as well as contain an indication, for each application, regarding whether the application is likely capable to execute the command represented in the text data 410. In another example, instead of indicating every application of the system, the N-best list data may only indicate all of the applications that are likely to be able to execute the command represented in the text data 410. In yet another example, the shortlister component 350 may implement thresholding such that the N-best list data may indicate no more than a maximum number of applications that may execute the command represented in the text data 410. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 410 by the shortlister component 350 relative to such applications).

The NLU component 260 may compile data, output by each of the recognizers 363 that processed the text data input to the NLU component 260, into a single N-best list, and may send N-best list data 440 (representing the N-best list) to a pruning component 450 (as illustrated in FIG. 4). Each entry in the N-best list data 440 may correspond to tagged text output by a different recognizer 363. Each entry in the N-best list data 440 may be associated with a respective score indicating the tagged text corresponds to the function associated with the recognizer 363 from which the tagged text was output. For example, the N-best list data 440 may be represented as:

[0.95] Intent: <PlayMusic> ArtistName: Lady Gaga SongName: Poker Face ContentSource: Music Skill

[0.70] Intent: <PlayVideo> ArtistName: Lady Gaga VideoName: Poker Face ContentSource: Video Skill

[0.01] Intent: <PlayMusic> ArtistName: Lady Gaga AlbumName: Poker Face ContentSource: Music Skill

[0.01] Intent: <PlayMusic> SongName: Pokerface ContentSource: Music Skill

The pruning component 450 creates a new, shorter N-best list (i.e., represented in N-best list data 460 discussed below) based on the N-best list data 440. The pruning component 450 may sort the tagged text represented in the N-best list data 440 according to their respective scores.

The pruning component 450 may perform score thresholding with respect to the N-best list data 440. For example, the pruning component 450 may select entries represented in the N-best list data 440 associated with a score satisfying (e.g., meeting and/or exceeding) a score threshold. The pruning component 450 may also or alternatively perform number of entry thresholding. For example, the pruning component 450 may select the top scoring entry(ies) associated with each different category of function (e.g., music, shopping, communications, etc.) represented in the N-best list data 440, with the new N-best list data 460 including a total number of entries meeting or falling below a threshold number of entries. The purpose of the pruning component 450 is to create a new list of top scoring entries so that downstream, more resource intensive processes may only operate on the tagged text entries that most likely correspond to the command input to the system.

The NLU component 260 may also include a light slot filler component 452. The light slot filler component 452 can take text from slots represented in the tagged text entry(ies) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the N-best list data 460.

The NLU component 260 sends the N-best list data 460 to an entity resolution component 470. The entity resolution component 470 can apply rules or other instructions to standardize labels or tokens from previous stages into an intent/slot representation. The precise transformation may depend on the function (e.g., for a travel function, the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each tagged text entry represented in the N-best list data 460. Specific intent/slot combinations may also be tied to a particular source, which may then be used to resolve the text. In the example "play songs by the stones," the entity resolution component 470 may reference a personal music catalog, Amazon Music account, user profile (described herein), or the like. The entity resolution component 470 may output data including an altered N-best list that is based on the N-best list represented in the N-best list data 460, but also includes more detailed information (e.g., entity IDs) about the specific entities mentioned in the slots and/or more detailed slot data that can eventually be used by a function. The NLU component 260 may include multiple entity resolution components 470 and each entity resolution component 470 may be specific to one or more functions.

The entity resolution component 470 may not be successful in resolving every entity and filling every slot represented in the N-best list data 460. This may result in the entity resolution component 470 outputting incomplete results. The NLU component 260 may include a final ranker component 490, which may consider such errors when determining how to rank the tagged text entries for potential execution. For example, if a book function recognizer 363 outputs a tagged text entry including a <ReadBook> intent flag, but the entity resolution component 470 cannot find a book with a title matching the text of the item, the final ranker component 490 may re-score that particular tagged text entry to be given a lower score. The final ranker component 490 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include function rating or popularity data. For example, if one function has a particularly high rating, the final ranker component 490 may increase the score of a tagged text entry(ies) associated with or otherwise invoking that particular function. The other data 491 may also include information about functions that have been specifically enabled by the user. For example, the final ranker component 490 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of device 110, user ID, context, and other information may also be considered. For example, the final ranker component 490 may consider when any particular functions are currently active (e.g., music being played, a game being played, etc.). Following final ranking, the NLU component 260 may output NLU output data 485 to the orchestrator component 230. The NLU output data 485 may include various entries, with each entry representing an NLU processing confidence score, an intent, slot data, and a potential skill or skill that may operating with respect to the respective entry's data.

Following preliminary ranking, the NLU component 260 may output NLU results data 485. The NLU component 260 may send the NLU results data 485 to the orchestrator component 230, which sends the NLU results data 485 to the aggregator component 265. The NLU results data 485 may include first NLU results data 485a including tagged text associated with a first skill, second NLU results data 485b including tagged text associated with a second skill, etc. The NLU results data 485 may include tagged text data corresponding to the top scoring tagged text entries as determined by the preliminary ranker component 490.

The orchestrator component 230 may send data output from the NLU component 260 to a aggregator component 265. The data 485 output from the NLU component 260 may include an N-best list of NLU results, where each item in the N-best list may correspond to a particular recognizer 363 and corresponding skill 290. Thus, for example, first NLU results of the N-best list may be associated with a first skill 290a, second NLU results of the N-best list may be associated with a second skill 290b, third NLU results of the N-best list may be associated with a third skill 290c, etc. Moreover, the first NLU results may correspond to text tagged to attribute meaning that enables the first skill 290a to execute with respect to the first NLU results, the second NLU results may correspond to text tagged to attribute meaning that enables the second skill 290b to execute with respect to the second NLU results, the third NLU results may correspond to text tagged to attribute meaning that enables the third skill 290c to execute with respect to the third NLU results, etc. The data 485 may also include scores corresponding to each item in the N-best list. Alternatively, the NLU result data 485 output to a particular skill 290 may include NER and IC data output by the particular skill's recognizer 363 while the NLU result data 485 output to the aggregator component 265 may include only a portion of the NLU result data 485, for example the scores corresponding to certain skills.

The system may be configured with thousands, tens of thousands, etc. skills 290. The aggregator component 265 enables the system to better determine the best skill 290 to execute the command input to the system. For example, first NLU results may correspond or substantially correspond to second NLU results, even though the first NLU results are operated on by a first skill 290a and the second NLU results are operated on by a second skill 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The aggregator component 265 (or other scheduling component such as orchestrator component 230) may solicit the first skill 290a and the second skill 290b to provide potential result data based on the first NLU results and the second NLU results, respectively. For example, the aggregator component 265 may send the first NLU results to the first skill 290a along with a request for the first skill 290a to at least partially execute a command with respect to the first NLU results. The aggregator component 265 may also send the second NLU results to the second skill 290b along with a request for the second skill 290b to at least partially execute a command with respect to the first NLU results. The aggregator component 265 receives, from the first skill 290a, first result data generated from the first skill's execution with respect to the first NLU results. The aggregator component 265 also receives, from the second skill 290b, second results data generated from the second skill's execution with respect to the second NLU results.

The result data 430 may include various components. For example, the result data 430 may include content (e.g., audio data, text data, and/or video data) to be output to a user. The result data 430 may also include a unique identifier (ID) used by the remote system 120 and/or the skill server(s) 125 to locate the data to be output to a user. The result data 430 may also include an instruction. For example, if the command corresponds to "turn on the light," the result data 430 may include an instruction causing the system to turn on a light associated with a profile of the device (110a/110b) and/or user.

The orchestrator component 230 may, prior to sending the NLU results data 485 to the aggregator component 265, associate intents in the NLU results data 485 with skills 290. For example, if the NLU results data 485 includes a <PlayMusic> intent, the orchestrator component 230 may associate the NLU results data 485 with one or more skills 290 that can execute the <PlayMusic> intent. Thus, the orchestrator component 230 may send the NLU results data 485 paired with skills 290 to the aggregator component 265. In response to input text data corresponding to "what should I do for dinner today," the orchestrator component 230 may generates pairs of skills 290 with associated intents corresponding to:

Skill 1/<Help>
Skill 2/<Order>
Skill 3/<DishType>

A system that does not implement the aggregator component 265 may select the highest scored preliminary ranked NLU results data 485 associated with a single skill. The system may send the NLU results data 485 to the skill 290 along with a request for output data. In some situations, the skill 290 may not be able to provide the system with output data. This results in the system indicating to the user that the command could not be processed even though another skill associated with lower ranked NLU results data 485 could have provided output data responsive to the command.

Figure 5C:
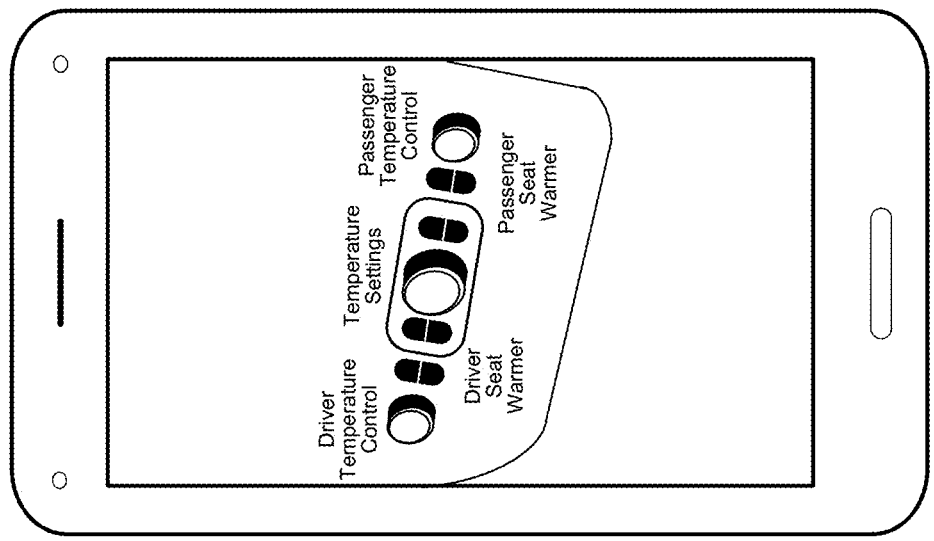

FIGS. 5A-5G illustrate examples of user interfaces according to embodiments of the present disclosure. As illustrated in FIG. 5A, the device 110 may enable an augmented reality user interface that may be used with a vehicle 30 to improve a user experience. For example, the augmented reality user interface may enable a user 5 to easily acquire information about features of the vehicle 30, a location of objects, buttons, and/or the like associated with the features, and other relevant information.

As illustrated in FIG. 5A, the device 110 may capture image data using the camera 118, and the image data may represent a portion of the vehicle 30. For example, FIG. 5A illustrates the portion of the vehicle 30 represented in the image data as a camera field of view 512. The device 110 may present a user interface 514 on the display 112 based on the image data. For example, the user interface 514 may include an image corresponding to the image data as a background layer, and may overlay label(s), symbol(s), visual effect(s), content (e.g., text, image, video, etc.), graphical elements, and/or the like over the image.

The field of view captured by the camera 118 may depend on a number of factors, including hardware characteristics of the device 110, an amount of optical/digital zoom selected, a position of the device 110, and/or the like. For example, individual image sensors may capture a specific field of view, such that individual devices 110 may have different camera field of views 512 at the same position. In addition, increasing an amount of optical zoom (e.g., magnification caused by a camera lens) and/or digital zoom (e.g., magnification caused by selecting a portion of the pixels captured by the image sensor) may decrease the camera field of view 512. Thus, lower optical/digital zoom may correspond to a wider field of view, whereas higher optical/digital zoom may correspond to a narrower field of view. The user interface 514 may control an amount of zoom in order to increase or decrease the camera field of view 512. In some examples, the user interface 514 may control the amount of zoom based on input from the user 5, although the disclosure is not limited thereto and the user interface 514 may control the amount of zoom based on a selected button/feature and/or for any reason without departing from the disclosure. Finally, the camera field of view 512 may be based on a position of the device 110, such that the user 5 may control the camera field of view 512 by manually moving the device 110 closer to the vehicle 30 or further away from the vehicle 30.

Figure 5B:
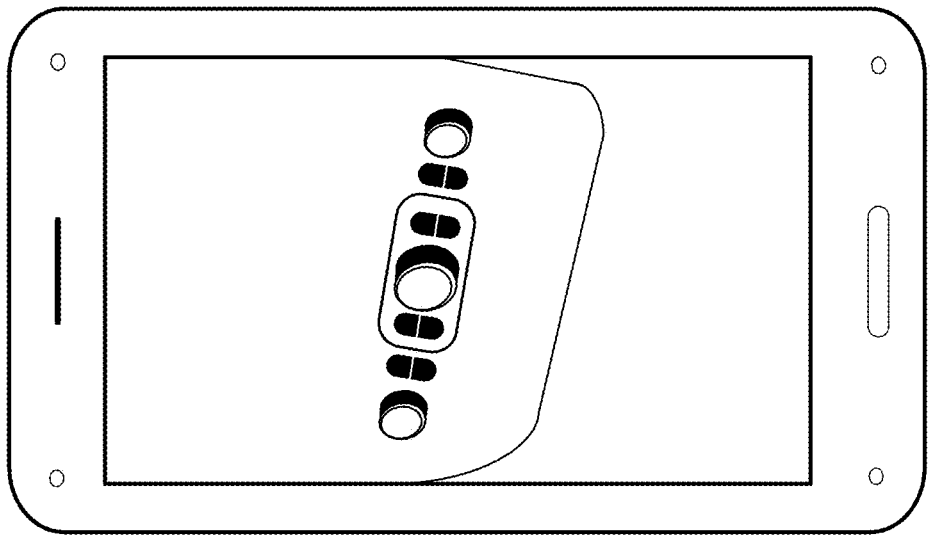

FIG. 5B illustrates an example of an original image 520, which may correspond to the image data captured by the camera 118. For example, the camera 118 may capture image data representing the portion of the vehicle 30 included within the camera field of view 512 and the device 110 may present the original image 520 on the display 112. Thus, the user interface 514 may represent the original image 520 as a background layer upon which the other graphical elements are displayed.

FIG. 5C illustrates an example of labels 530 that may be displayed by the user interface 514. For example, the labels 530 may correspond to names associated with individual parts of the vehicle 30 and therefore the user interface 514 may present the labels 530 as visually connected to corresponding parts of the vehicle 30 represented in the original image. As used herein, presenting a graphical element as visually connected to a portion of an image may correspond to overlaying (e.g., superimposing) the graphical element above the image (e.g., displaying the graphical element in addition to the image), such as directly above, in proximity to, and/or alongside the portion of the image, such that the graphical element is displayed in addition to the portion of the image in the user interface 514.

In some examples, the labels 530 may correspond to individual parts of the vehicle 30, such as individual buttons or components represented in the original image 520, although the disclosure is not limited thereto. For example, the original image 520 includes a representation of several buttons in the vehicle 30, and FIG. 5C illustrates the buttons corresponding to labels 530 such as "Driver Temperature Control," "Temperature Settings," "Passenger Temperature Control," "Driver Seat Warmer," and "Passenger Seat Warmer." While FIG. 5C illustrates examples of labels 530 corresponding to specific buttons, the labels 530 may also correspond to components of the vehicle 30 included within the cabin (e.g., gas pedal, brake pedal, steering wheel, etc.), an engine compartment (e.g., oil gauge, battery, air intake, etc.), or an exterior of the vehicle 30 (e.g., tires, sunroof, hood, etc.) without departing from the disclosure. Each button/component within the vehicle 30 may correspond to one or more labels 530, although a placement of the labels 530 relative to the button/component may vary depending on the user interface 514.

While the examples described above correspond to individual buttons/components, in some examples the labels 530 may correspond to parts of the vehicle 30 that do not correspond to individual buttons/components without departing from the disclosure. For example, the labels 530 may correspond to regions within the vehicle 30 (e.g., engine compartment, glove compartment, etc.), a portion of the vehicle 30 (e.g., dashboard, roof, floor, etc.), a combination of parts of the vehicle 30 (e.g., temperature controls, instrument panel, entertainment system, etc.), and/or the like. Additionally or alternatively, the labels 530 may correspond to features of the vehicle 30 (e.g., rear park assist, heads-up display, automatic climate control, etc.), which may correspond to multiple buttons/components or may not correspond to a physical part of the vehicle 30 at all. For example, when an individual feature does not correspond to a physical location within the vehicle 30, the user interface 514 may not display a label 530 or may display a label 530 for the feature at a relevant location (e.g., display a label of "Fuel Economy" in proximity to the engine of the vehicle 30), in a particular location for all labels (e.g., multiple labels displayed in a specific area outside of the vehicle 30), and/or the like without departing from the disclosure.

Figure 5E:
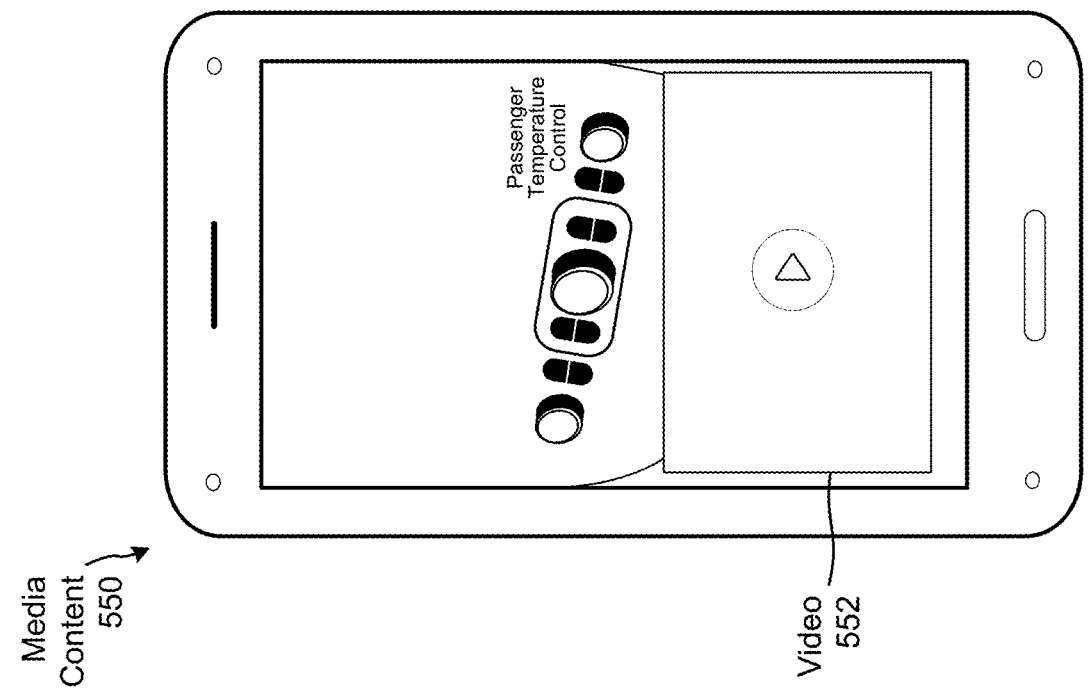
Figure 5D:
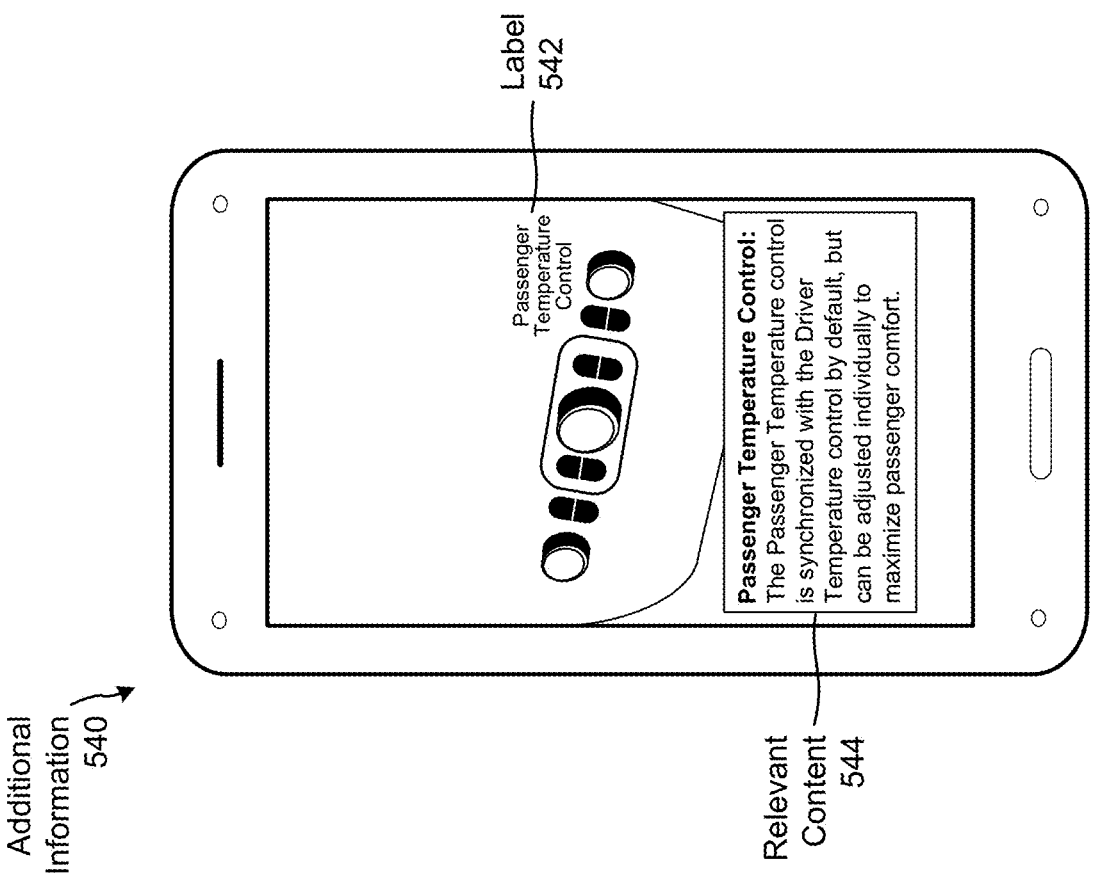
Figure 5G:
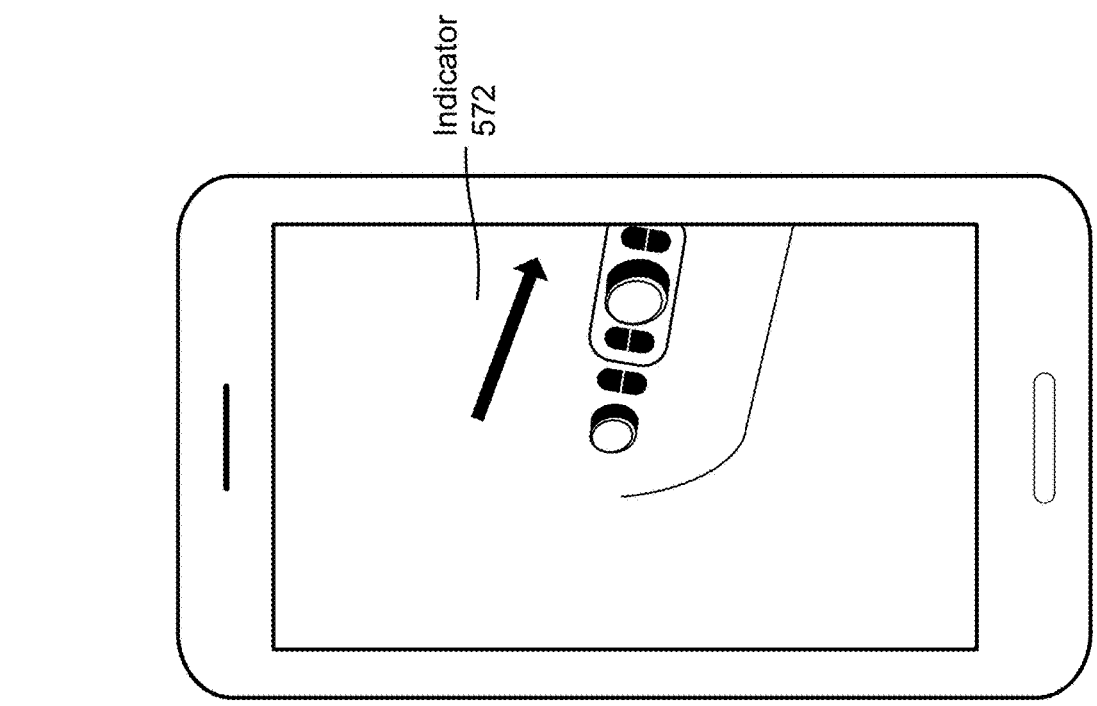

In some examples, the user interface 514 may display additional information 540 associated with a specific label 542, as illustrated in FIG. 5D. For example, the user 5 may select the label 542 (e.g., by touching the display 112, voice command, and/or the like) or may request additional information about a feature/component of the vehicle 30 and the user interface 514 may acquire and display relevant content 544. As illustrated in FIG. 5D, the user interface 514 may display the selected label 542 (e.g., "Passenger Temperature Control") along with the relevant content 544 (e.g., a description associated with "Passenger Temperature Control"). The relevant content 544 may correspond to information included within a user manual of the vehicle 30, although the disclosure is not limited thereto. The relevant content 544 may be stored in a database on the device 110, may be received from the remote system 120, may be received from a third party system 20, and/or the like.

In some examples, the relevant content 544 may correspond to data corresponding to a plurality of objects. For example, each object, feature, component, and/or the like within the vehicle 30 (hereinafter, "object") may be associated with one or more data objects representing relevant information associated with the object. For example, each data object may include two or more of the following subfields of information: "location," "title," "content," "response," "image," and/or "intent," although the disclosure is not limited thereto. In some examples, each data object must include a "response" and "location," whereas "title," "content," and "image" may be optional, although the disclosure is not limited thereto.

The "location" subfield may indicate a location of the object within the vehicle 30 using any position data and/or coordinates necessary to specifically identify the object. The "title" subfield may indicate a name associated with the data object, such as a name of the object (e.g., object, feature, component, and/or the like) within the vehicle 30. The "content" subfield may indicate any relevant information to display or output when the object is selected by the user interface. The "response" subfield may indicate how the user interface may respond to a selection of the object. The "image" subfield may include image data to be displayed by the user interface when the object is selected, including a representation of an image, a video, and/or the like. The "intent" subfield may correspond to specific queries about the object and may indicate an action to perform by the device 110 in response to an individual query. However, the examples described above are included for illustrative purposes only and the disclosure is not limited thereto.

In some examples, the user interface 514 may display media content 550, as illustrated in FIG. 5E. For example, the media content 550 may correspond to a video 552 illustrating a particular feature/component of the vehicle 30. To illustrate an example, if the user 5 requests information about how to control radio presets in the entertainment system, the user interface 514 may display relevant content 544 describing how to control radio presets and/or a video 552 representing an example of controlling the radio presets. While FIG. 5E illustrates the media content 550 as corresponding to a video 552, the disclosure is not limited thereto and the media content 550 may correspond to image(s), video(s), a graphical element associated with audio, a combination thereof, and/or the like without departing from the disclosure. In some examples, the media content 550 may be stored in the data object described above, although the disclosure is not limited thereto.

Figure 5F:
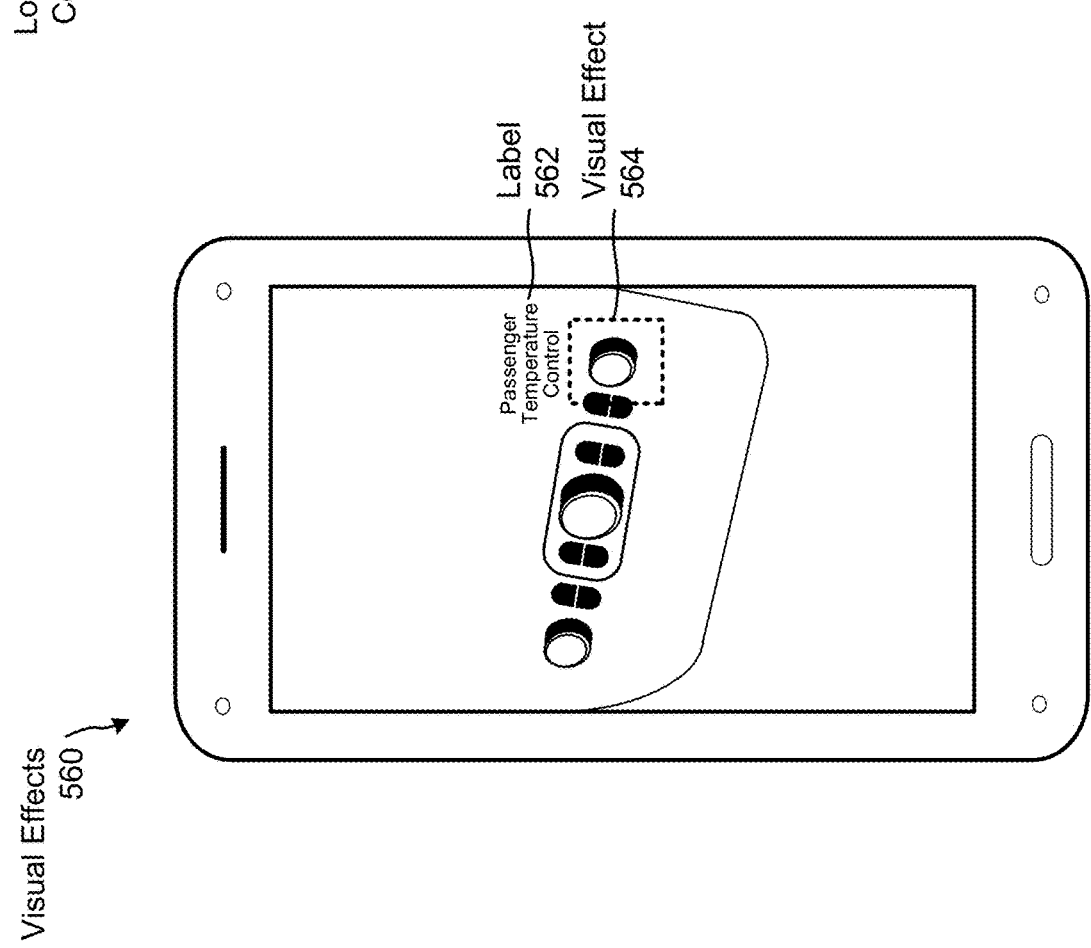

In some examples, the user interface 514 may display visual effects 560. For example, FIG. 5F illustrates that the user interface 514 represents a specific component of the vehicle 30 along with a corresponding label 562 and a visual effect 564 emphasizing the component. Visual effects 560 may correspond to a static graphical element (e.g., highlighting, borders, symbols, etc. that are statically displayed for a long period of time), a dynamic graphical element (e.g., highlighting, borders, symbols, etc. that are displayed for a short period of time and/or vary over time, like a transition), and/or any visual effects known to one of skill in the art without departing from the disclosure.

In some examples, the user interface 514 may display an indicator 572 to provide location context 570 for the user 5. For example, the user interface 514 may display information about a component that is not currently represented in the user interface 514, such as when the device 110 is not directed at the component. To assist the user 5 in identifying a location of the component, the user interface 514 may display the indicator 572. As illustrated in FIG. 5F, the indicator 572 may correspond to a symbol (e.g., arrow), although the disclosure is not limited thereto. Instead, the indicator 572 may correspond to any graphical element and/or visual effect known to one of skill in the art without departing from the disclosure.

FIG. 6 illustrates an example of inputs and outputs according to embodiments of the present disclosure. As illustrated in FIG. 6, the device 110 may send outputs 630 to the remote system, may receive inputs 640 from the remote system, may send/receive inputs/outputs 660 to other devices (e.g., third party server(s) 20, the vehicle 30, etc.), and/or may output content to the user 5 using a user interface 610.

As discussed above with regard to FIGS. 5A-5F, the user interface 610 may represent an image corresponding to a camera image 612 (e.g., image captured by the camera 118, which may represent a portion of the vehicle 30), labels 614, visual effects 616, textual information 618, and/or media content 620. Additionally or alternatively, the user interface 514 may generate output audio 622 directed to the user 5. For example, the output audio 622 may correspond to audio associated with the media content 620, synthesized speech generated by the remote system 120, audible sounds associated with the user interface 610, and/or the like.

While displaying the user interface 610 to the user 5, the device 110 may send input audio data 632, image data 634, position data 636, vehicle data 638, and/or other data to the remote system 120. The input audio data 632 may be generated by the microphone(s) 114 and may capture an utterance from the user 5. Thus, the remote system 120 may process the input audio data 632 to determine a voice command, enabling the device 110 to be speech-enabled and respond to voice commands.

The image data 634 may correspond to the camera image 612 represented by the user interface 610 and may be captured by the camera 118 of the device 110. Thus, the remote system 120 may process the image data 634 using computer vision or the like to detect objects (e.g., individual symbols, buttons, etc. represented in the image data 634), determine vehicle information (e.g., manufacturer, model, model year, trim, etc.), and/or the like. However, the disclosure is not limited thereto, and in some examples the device 110 may process the image data 634 locally without sending the image data 634 to the remote system 120. For example, the device 110 may process the image data 634 using less-sophisticated camera vision operating locally on the device 110.

Additionally or alternatively, in some examples the device 110 may process original image data captured by the camera(s) 118 and generate the image data 634 as a model representing the original image data. For example, the image data 634 may correspond to a feature cloud representing a number of features from the original image data. The number of features may correspond to points of interest in the original image data, such that the image data 634 represents a model of the original image data instead of an actual image. Thus, the feature cloud may indicate certain contrasts, geometric shapes (e.g., circle at a first position, square at a second position, etc.), other lower-level features (e.g., lines, shapes, etc.), and/or the like represented in a portion of the original image data.

The position data 636 may correspond to information about a field of view of the camera 118. Thus, the remote system 120 may use the position data 636 to interpret the voice command. For example, the remote system 120 may process the input audio data 632 to determine that the voice command corresponds to a query (e.g., "What button is this?") and may interpret the position data 636 to respond to the query (e.g., determine which button is represented in the user interface 610 based on the position data 636). As will be discussed in greater detail below, the position data 636 may correspond to coordinates of the camera field of view, a plurality of labels associated with the camera field of view (e.g., all labels included within the camera field of view), specific labels associated with the camera field of view (e.g., labels associated with a perimeter of the camera field of view), a single label associated with the camera field of view (e.g., a label closest to a center of the camera field of view), and/or the like without departing from the disclosure. Thus, the remote system 120 process the position data 636 to estimate which buttons/components are represented by the user interface 610.

While FIG. 6 illustrates the outputs 630 including the input audio data 632, the image data 634, and the position data 636, the disclosure is not limited thereto and the outputs 630 may vary. For example, the device 110 may send only the input audio data 632 at a first time, may send only the image data 634 at a second time, may send the input audio data 632 and the image data 634 at a third time, may send the input audio data 632 and the position data 636 at a fourth time, may send the image data 634 and the position data 636 at a fifth time, and/or the like.

The remote system 120 may process the outputs 630 and may send the inputs 640 back to the device 110. For example, the remote system 120 may send command data 642, output audio data 644, feature indication 646, reference(s) 648, textual information 650, media content 652, and/or the like to the device 110. The command data 642 may correspond to an instruction to the device 110, such as an instruction to display specific information on the user interface 610 and/or generate the output audio 622 based on the output audio data 644.

The output audio data 644 may correspond to audio that is associated with the command data 642 and/or the user interface 610. For example, the output audio data 644 may include synthesized speech generated by the remote system 120 that corresponds to a notification to the user 5 (e.g., responding to the voice command), information associated with the user interface 610 (e.g., description of a feature/component of the vehicle 30), and/or the like.

The feature indication 646 may indicate a specific feature (e.g., feature, component, button, etc.) to display on the user interface 610. For example, if the input audio data 632 corresponds to a query (e.g., "What button is this?"), the feature indication 646 may identify the feature and/or a label 614 associated with the feature and the user interface 610 may display the label 614 along with visual effects 616, textual information 618, and/or media content 620.

Reference(s) 648, textual information 650 and/or media content 652 correspond to output data associated with content to display on the user interface 610. For example, the reference(s) 648 correspond to link(s) to output data that is accessible by the device 110, whereas textual information 650 corresponds to text data sent from the remote system 120 to the device 110 and media content 652 corresponds media data sent from the remote system 120 to the device 110. Thus, the remote system 120 may refer to a portion of the output data using the reference(s) 648 and may supplement the portion of the output data with additional textual information 650 and/or media content 652 that is relevant.

The reference(s) 648 may refer to local data (e.g., data stored in a database 600 of the device 110) and/or remote data (e.g., data stored in the third party server(s) 20, the vehicle 30, and/or any device not associated with the remote system 120) without departing from the disclosure. For example, the device 110 may retrieve a first portion of the output data from the database 600 and request a second portion of the output data from the third party server(s) 20 and/or the vehicle 30. To illustrate an example, the database 600 may store user manual data corresponding to a user manual associated with the vehicle 30. Thus, the reference(s) 648 may refer to a portion of the user manual data that corresponds to information from the user manual associated with a specific feature/component of the vehicle 30. The device 110 may retrieve the portion of the user manual data indicated by the reference(s) 648 and may generate the user interface 610, which may present information about the specific feature/component of the vehicle 30 on the display 112 and/or generate output audio 622 using the loudspeakers 116. Additionally or alternatively, the reference(s) 648 may correspond to output data stored on the third party server(s) 20. For example, the device 110 may send request data 662 to the third party server(s) 20 requesting the output data and the third party server(s) 20 may send the output data (e.g., textual information 664 and/or media content 666) to the device 110.

In some examples, the device 110 may send the request data 662 to the vehicle 30 and/or a remote device associated with the vehicle 30 and may receive vehicle data 668 associated with the vehicle 30. Thus, the output data may include the vehicle data 668, enabling the device 110 to display information associated with the vehicle 30 on the user interface 610. For example, the user interface 610 may display current mileage, fuel efficiency, trip information, estimated fuel range, and/or the like without departing from the disclosure.

The device 110 may generate the user interface 610 based on the output data, which includes a first portion received from the remote system 120 (e.g., the command data 642, the output audio data 644, the feature indication 646, the textual information 650, and/or the media content 652), a second portion stored on the device 110 (e.g., portion of the user manual data retrieved from the database 600), a third portion received from a remote device (e.g., the textual information 664, the media content 666, and/or the vehicle data 668) and/or a combination thereof without departing from the disclosure. Thus, the remote system 120 may send reference(s) 648 corresponding to the second portion and the third portion of the output data and may supplement this with the textual information 650 and/or the media content 652.

Using the output data, the device 110 may generate the labels 614, the visual effects 616, the textual information 618, the media content 620, and/or the output audio 622 associated with the user interface 610. Depending on the camera image 612, inputs from the user 5, the command data 642, and/or the like, the user interface 610 may display content associated with a plurality of features (e.g., a plurality of labels 614) and/or a selected feature (e.g., relevant labels 614 along with corresponding visual effects 616, textual information 618, media content 620, etc.). To illustrate a first example, the user interface 610 may display the labels 614 on top of the camera image 612 at a first time (e.g., to enable the user 5 to view features/components of the vehicle 30). To illustrate a second example, the user interface 610 may display selected labels 614 along with corresponding content (e.g., visual effects 616, textual information 618, media content 620, etc.) on top of the camera image 612 while generating the output audio 622 at a second time (e.g., in response to a voice command or other input requesting information about a feature/component of the vehicle 30).

In some examples, the device 110 may only display a portion of the output data. For example, the device 110 may determine the content to display based on the command data 642, the feature indication 646, and/or the like. To illustrate an example, the command data 642 and/or the feature indication 646 may indicate specific content to display initially (e.g., a particular image, section of the user manual, and/or the like), but the output data may include additional information to display in response to input from the user 5. Thus, if the user 5 uses an input component (e.g., touchscreen of the display 112) to select one of the labels 614 and/or otherwise select additional information, the device 110 may modify the user interface 610 to display the additional content included in the output data.

Figure 8:
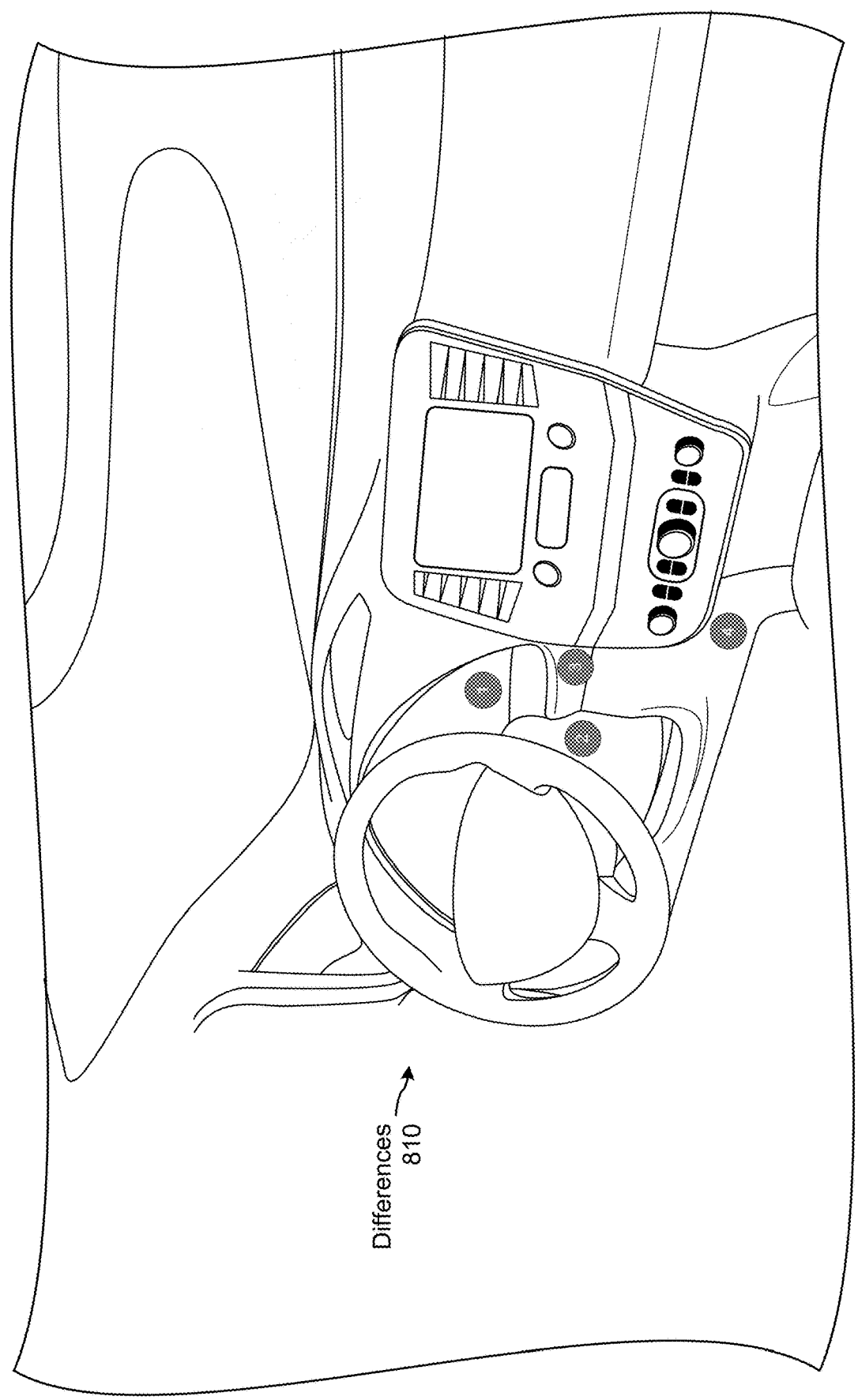
FIG. 8 illustrates an example of highlighting differences between a current vehicle and a known vehicle according to embodiments of the present disclosure.

Using the user interface 610, the device 110 may present information to the user 5 in a number of different ways. As a first example, the device 110 may label all physical objects (e.g., buttons, components) of the vehicle 30 to enable the user 5 to easily learn more about the vehicle 30 and a layout of the vehicle 30, as illustrated in FIG. 5C. As a second example, the device 110 may display additional information about a selected feature, enabling the user 5 to learn more about individual features of the vehicle 30 as illustrated in FIGS. 5D-5E. As a third example, the device 110 may display features of interest that may provide the user 5 information about specific features and/or benefits associated with the vehicle 30, as illustrated in FIG. 7. As a fourth example, to enable the user 5 to easily learn how to control the vehicle 30, the device 110 may compare a current vehicle to a vehicle associated with the user 5 and highlight any differences, as illustrated in FIG. 8. As a fifth example, the device 110 may provide contextual information to assist the user 5 in locating a specific feature, as illustrated in FIGS. 5E-5F and 9. As a sixth example, the device 110 may enable the user 5 to request additional information about a feature based on what is captured by the camera 118 of the device 110 and/or a position of the device 110, as illustrated in FIGS. 10A-10B.

FIG. 7 illustrates an example of emphasizing features of interest according to embodiments of the present disclosure. As illustrated in FIG. 7, the device 110 may display and/or emphasize features of interest 710 to provide the user 5 information about specific features and/or benefits associated with the vehicle 30. For example, the features of interest 710 may correspond to important features associated with the vehicle 30, features associated with a certain category selected by the user 5 and/or the remote system 120, and/or the like. However, the disclosure is not limited thereto and the features of interest 710 may correspond to any features of the vehicle 30 without departing from the disclosure.

FIG. 8 illustrates an example of highlighting differences between a current vehicle and a known vehicle according to embodiments of the present disclosure. For example, the system 100 may compare first vehicle information associated with a first vehicle (e.g., vehicle with which the user 5 is previously familiar) to second vehicle information associated with a second vehicle (e.g., the vehicle 30 in which the user 5 is using the device 110) and may display differences 810 between the first vehicle and the second vehicle. In some examples, the differences 810 may correspond to major differences between the first vehicle and the second vehicle. For example, the device 110 may display differences 810 corresponding to marketing content that identify benefits that the second vehicle has over the first vehicle. Thus, the device 110 may provide important information to the user 5 when the user 5 is purchasing a new car.

In other examples, the differences 810 may correspond to different features required to operate the second vehicle. For example, the device 110 may display differences 810 associated with specific control operations, such as starting the ignition, controlling windshield wipers and/or headlights, a location of the parking brake, which side the gas tank is on, and/or the like. Thus, the device 110 may provide important information to the user 5 when the user 5 is renting a car with which the user 5 is unfamiliar. However, the disclosure is not limited thereto and the differences 810 may correspond to any differences known to one of skill in the art without departing from the disclosure.

In some examples, the device 110 and/or the remote system 120 may determine the first vehicle information based on a user profile associated with the device 110. For example, the user profile may list previous vehicles owned by the user 5. However, the disclosure is not limited thereto and the device 110 and/or the remote system 120 may determine the first vehicle information based on input from the user 5 and/or any other technique known to one of skill in the art.

The device 110 and/or the remote system 120 may determine the second vehicle information based on input from the user 5 (e.g., user selection, voice input, Vehicle Identification Number (VIN), etc.), image data (e.g., using computer vision to identify the second vehicle information), and/or other data, as will be described in greater detail below with regard to FIG. 15.

FIG. 9 illustrates an example of highlighting a specific feature of interest according to embodiments of the present disclosure. As described above, the device 110 and/or the remote system 120 may select an individual feature and may provide additional information about the selected feature to the user 5. When the camera 118 captures image data representing the selected feature 910, the device 110 may display the additional information along with other visual effects. However, when the selected feature 910 is not represented in the image data captured by the camera 118, the device 110 may instead display contextual information to assist the user 5 in locating the selected feature 910.

As illustrated in FIG. 9, the camera 118 may capture image data corresponding to a camera field of view 912, which represents a portion of the vehicle 30. However, the camera field of view 912 does not include a representation of the selected feature 910, which is illustrated in FIG. 9 as part of the instrument panel of the vehicle 30. To assist the user 5 in locating the selected feature 910, the device 110 may display a position indicator 914, which is illustrated in FIG. 9 as an arrow pointing from the camera field of view 912 to the selected feature 910. For example, the device 110 may determine a first location associated with the camera field of view 912, a second location associated with the selected feature 910, and may determine a direction from the first location to the second location. Based on the direction, the device 110 may display a symbol, visual effect, and/or other graphical element to convey to the user 5 the direction associated with the second location.

The device 110 may determine the first location associated with the camera field of view 912 based on position data. For example, the position data may correspond to information about an orientation of the device 110, a direction of the camera 110, objects or features represented in image data associated with the camera field of view 912, and/or the like. In some examples, the position data may correspond to any information associated with an orientation of the device 110 with which the device 110 may determine which objects are represented in the image data captured by the camera 118. For example, the device 110 may include inertial sensors (e.g., accelerometer, gyroscope, inclinometer, and/or magnetometer) that generate sensor data and the sensor data may be included as a portion of the position data. However, the disclosure is not limited thereto, and in other examples the device 110 may determine the orientation of the device 110 and/or which objects are represented in the image data using the sensor data and the position data may only correspond to information associated with which objects are represented in the image data (e.g., included within the camera field of view) without departing from the disclosure.

Figure 10A:
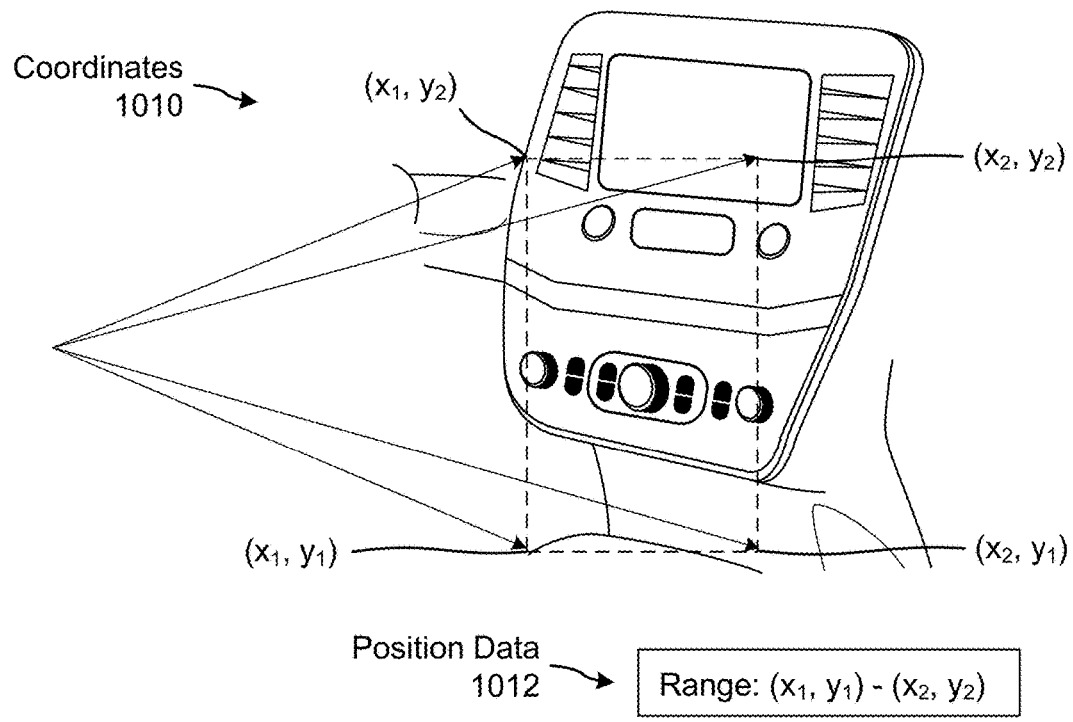
FIGS. 10A-10B illustrate examples of determining position data according to embodiments of the present disclosure.
Figure 10B:
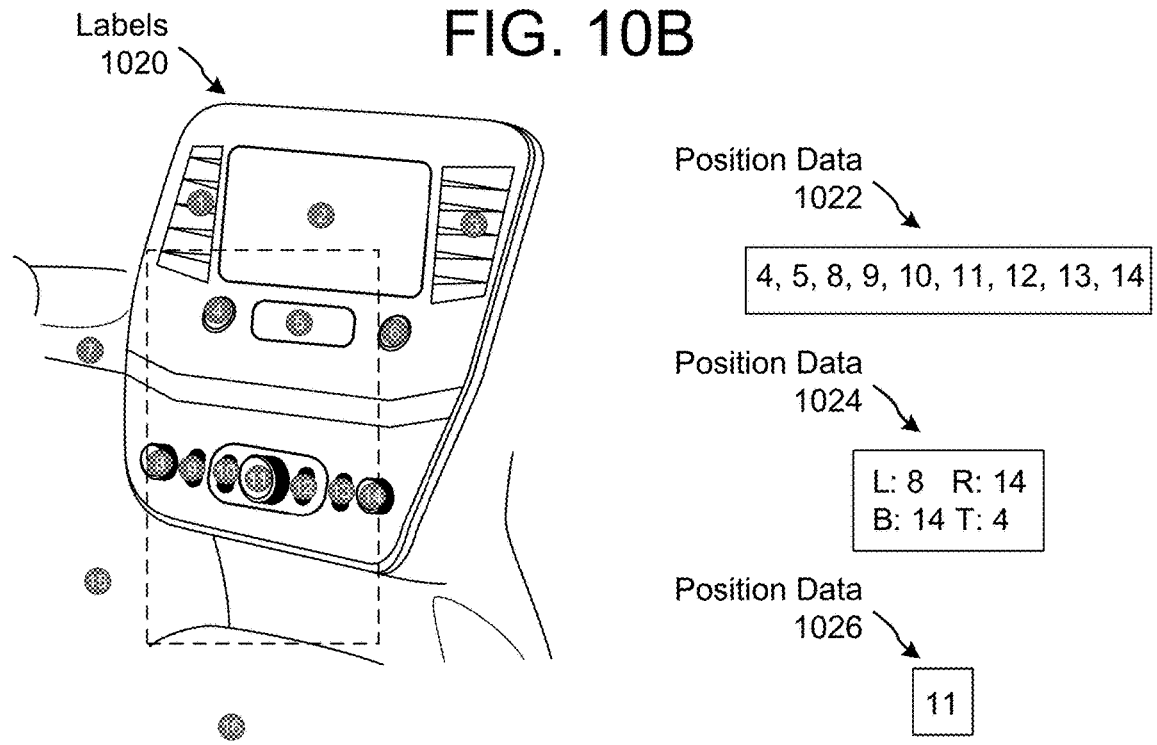

Using this limited scope of position data, FIGS. 10A-10B illustrate examples of determining position data according to embodiments of the present disclosure. As illustrated in FIG. 10A, in some examples the device 110 may determine the position data based on coordinates 1010 (e.g., a range of coordinates associated with the camera field of view). For example, FIG. 10A illustrates the camera field of view as a rectangle having four corners, with a bottom left corner having first coordinates 1010a of ($x_1$, $y_1$), a bottom right corner having second coordinates 1010b of ($x_2$, $y_1$), a top left corner having third coordinates 1010c of ($x_1$, $y_2$), and a top right corner having fourth coordinates 1010d of ($x_2$, $y_2$). Thus, the camera field of view corresponds to a range of coordinates. For example, FIG. 10A illustrates position data 1012 indicating a range from the first coordinates 1010a (e.g., ($x_1$, $y_1$)) to the fourth coordinates 1010d (e.g., ($x_2$, $y_2$)), although the disclosure is not limited thereto.

For ease of illustration, FIG. 10A illustrates the coordinates 1010 as two-dimensional (2D) coordinates, comprising x-coordinates along an x-axis and y-coordinates along a y-axis. However, the disclosure is not limited thereto, and the coordinates 1010 may be three-dimensional (3D) coordinates without departing from the disclosure. Thus, in addition to the x-coordinates and the y-coordinates, the coordinates 1010 may also comprise z-coordinates along a z-axis without departing from the disclosure. In some examples, the device 110 may only determine the 2D coordinates but the remote system 120 may determine the 3D coordinates based on the coordinates 1010 and position data associated with a current position of the device 110.

While the device 110 may be capable of determining the coordinates, this may require additional processing power and/or may be inexact due to a distance between the device 110 and different surfaces of the vehicle 30. Instead of determining precise coordinates, in some examples the device 110 may approximate the camera field of view based on which labels 1020 are represented within the camera field of view.

As illustrated in FIG. 10B, the device 110 may determine the position data based on the labels 520 (e.g., one or more labels represented within the camera field of view). For example, the device 110 may generate first position data 1022 indicating each label represented within the camera field of view. In the example illustrated in FIG. 10B, each label is represented as a number and the first position data 1022 indicates that labels 4, 5, 8, 9, 10, 11, 12, 13, and 14 are represented within the camera field of view. In contrast, labels 1, 2, 3, 6, 7, 15, and 16 are in proximity to the camera field of view but not represented within the camera field of view. While the first position data 1022 lacks the precision of the position data 1012, the first position data 1022 effectively conveys each of the labels 1020 included within the camera field of view.

In some examples, the device 110 may generate second position data 1024 that approximates the camera field of view by including labels associated with each boundary of the camera field of view (e.g., each side of the rectangle). For example, a left boundary (e.g., vertical boundary enclosing the left side of the rectangle) may be represented by a left-most label (e.g., label having a lowest x-coordinate, such as label 8), a right boundary (e.g., vertical boundary enclosing the right side of the rectangle) may be represented by a right-most label (e.g., label having a highest x-coordinate, such as label 14), a bottom boundary (e.g., horizontal boundary enclosing the bottom side of the rectangle) may be represented by a bottom-most label (e.g., label having a lowest y-coordinate, such as label 14), and a top boundary (e.g., horizontal boundary enclosing the top side of the rectangle) may be represented by a top-most label (e.g., label having a highest y-coordinate, such as label 4). Thus, the second position data 1024 is illustrated in FIG. 10B as "L:8 R:14 B:14 T:14," although this is intended for illustrative purposes only and the position data may vary without departing from the disclosure. While the second position data 1024 lacks the precision of the position data 1012 and omits several labels 1020 included in the first position data 1022, a size of the second position data 1024 is reduced relative to a size of the first position data 1022 and the device 110 and/or the remote system 120 may identify each of the labels 1020 included within the camera field of view based on the second position data 1024.

In some examples, the device 110 may generate third position data 1026 that only includes a single label associated with a center of the camera field of view. For example, the device 110 may determine a center of the camera field of view and may select a label that is closest to the center of the camera field of view (e.g., label 11). The system 100 may optionally approximate the camera field of view based on other information (e.g., other position data, image data, sensor data such as distance information, and/or the like) and/or assumptions (e.g., fixed distance between the 110 and the vehicle 30, fixed field of view associated with the device 110, etc.). However, the disclosure is not limited thereto and the system 100 may process a voice command or other input using only the single label included in the third position data 1026.

While FIGS. 10A-10B illustrate different examples of position data, the disclosure is not limited thereto and the position data may vary without departing from the disclosure. For example, the position data may include sensor data or other information that is not illustrated in FIGS. 10A-10B. Additionally or alternatively, the position data may include two or more of the examples illustrated in FIGS. 10A-10B without departing from the disclosure. For example, the position data may indicate an approximate range of the camera field of view (e.g., the position data 1012, the first position data 1022, and/or the second position data 1024) as well as a label closest to a center of the camera field of view (e.g., the third position data 1026). For example, if the camera field of view only includes a small number of labels 1020, a center of the approximate range indicated by the first position data 1022 and/or the second position data 1024 may not accurately correspond to a center of the camera field of view indicated by the third position data 1026.

The position data illustrated in FIGS. 10A-10B may enable the system 100 to identify a label included within the camera field of view and provide information about a corresponding feature to the user 5. For example, if the user 5 inputs a voice command corresponding to a query (e.g., "What button is this?"), the system 100 may process the position data to determine that the query corresponds to a first label included within the camera field of view and may provide information about the first label. In some examples, the system 100 may determine that the position data corresponds to a single label and may process the voice command using the single label (e.g., when a single label is present near a center of the camera field of view). In other examples, the system 100 may determine that the position data corresponds to multiple labels, may process the voice command using the multiple labels (e.g., when multiple labels are present near a center of the camera field of view), and may display information about one of the multiple labels. However, the disclosure is not limited thereto, and the system 100 may determine that the position data corresponds to all labels within the camera field of view and may process the voice command using all of the labels without departing form the disclosure.

In some examples, input data from inertial sensors or other input devices can be used to determine an orientation of the device 110 and/or the camera field of view. For example, the device 110 may track the camera field of view over time using the input data.

In some examples, the device 110 may determine the orientation of the device and/or the camera field of view by detecting and/or tracking objects represented in the image data. For example, device motion data captured by one or more inertial sensors can be used as a cue for where to begin detecting and/or tracking an object in image data or to limit regions of the image data for detecting and/or tracking the object.

In some embodiments, multiple image-based object detection and/or tracking processes can be executed simultaneously, other motion determination techniques can be performed, and/or other sensor data analyzed to determine the camera field of view. The data obtained by these independent processes can be aggregated for more robustly determine the camera field of view. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of vehicle position and/or orientation from the camera(s) of the device, probability estimates of device position and/or orientation from the inertial sensor(s) of the device, and/or other probability estimates. The probabilistic system can define the position and/or orientation of the vehicle with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

In still other embodiments, a computing device can include other types of imaging elements, such as ambient light sensors, IR sensors, and other optical, light, imaging, or photon sensors, or other types of motion/orientation determination elements, such as accelerometers, gyroscopes, magnetometers, inclinometers, proximity sensors, distance sensors, depth sensors, range finders, ultrasonic transceivers, among others.

In other embodiments, determining the camera field of view can be based on input data captured using one or more sensors or other input devices of a computing system. For instance, a proximity sensor can be used to estimate an initial position of an object of interest (e.g., part of the vehicle 30) with respect to the device 110. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of a vector between the vehicle and the computing device.

In still other embodiments, a combination of image-based tracking and tracking by inertial sensors can be used to track an object of interest (e.g., part of the vehicle 30). As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but the vehicle 30 moves relative to the device 110, inertial sensors will indicate no change in position of the vehicle 30 with respect to the device 110. Image-based tracking, on the other hand, may be more likely to detect the motion of the vehicle with respect to the device. As another example, a user may be operating a device in a moving vehicle. Inertial sensors may indicate that the device is moving according to the direction of the vehicle even though the device may remain stationary with respect to the vehicle. Image-based tracking can be more reliable in determining the position of the vehicle with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, the device may be equipped with an ambient light sensor that can be used to improve performance of the system 100. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the device's position with respect to the vehicle or related information, such as the device's viewing angle with respect to the vehicle (e.g., camera field of view). Such an approach may be more efficient and/or accurate than using methods based on either image analysis or motion/orientation sensors alone.

Figure 11:
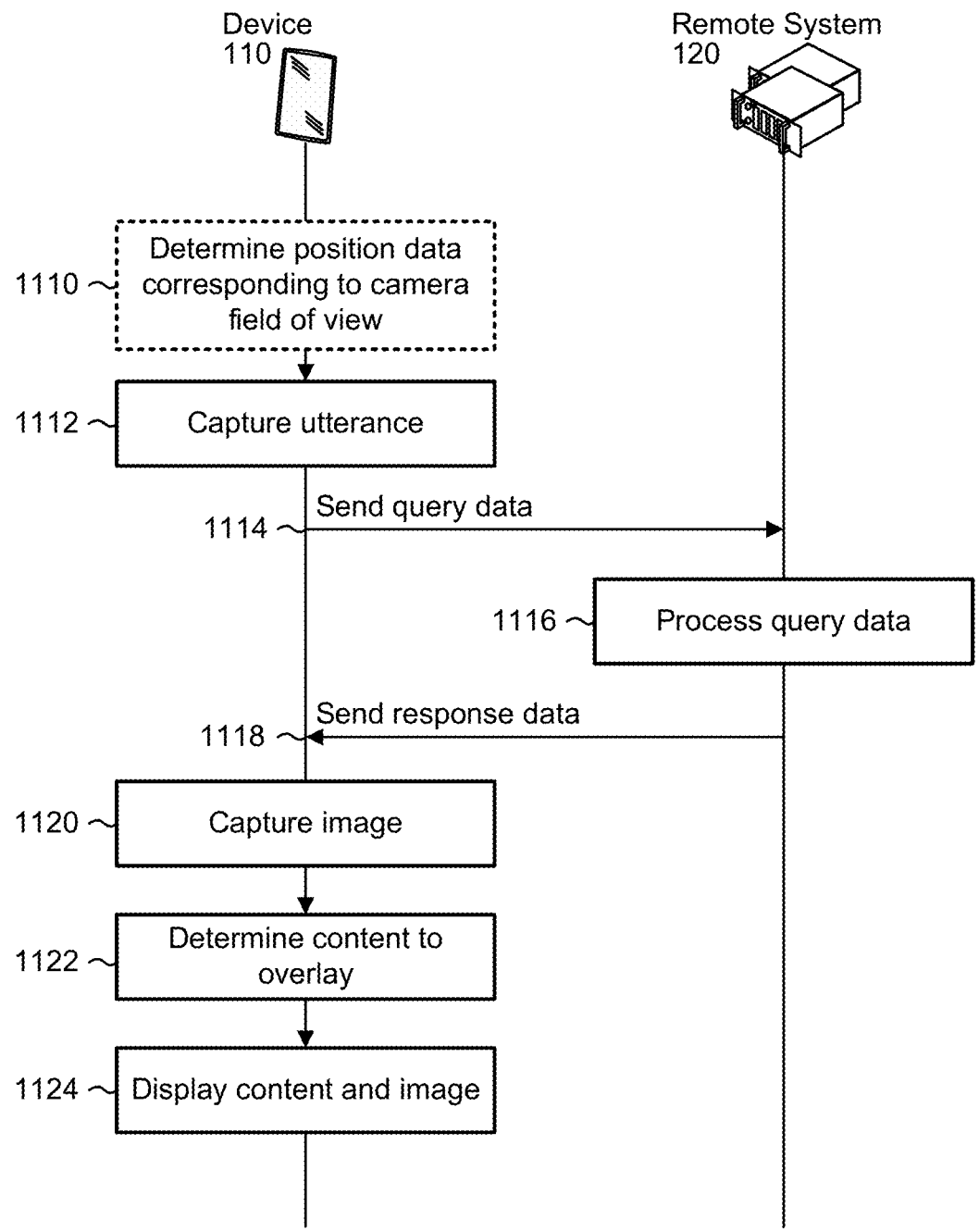
FIG. 11 is a communication diagram conceptually illustrating an example of speech-enabled augmented reality according to embodiments of the present disclosure.

FIG. 11 is a communication diagram conceptually illustrating an example of speech-enabled augmented reality 1100 according to embodiments of the present disclosure. As illustrated in FIG. 11, the device 110 may optionally determine (1110) position data corresponding to a camera field of view, may capture (1112) an utterance using the microphone(s) 114 and may send (1114) query data to the remote system 120. For example, the device 110 may capture the utterance as input audio data and the query data may include the input audio data and/or the position data.

The remote system 120 may process (1116) the query data to generate response data and may send (1118) the response data to the device 110. The device 110 may capture (1120) an image using the camera 118, may determine (1122) content to overlay on top of the image based on the response data, and may display (1124) the content and the image on the display 112.

Figure 12A:
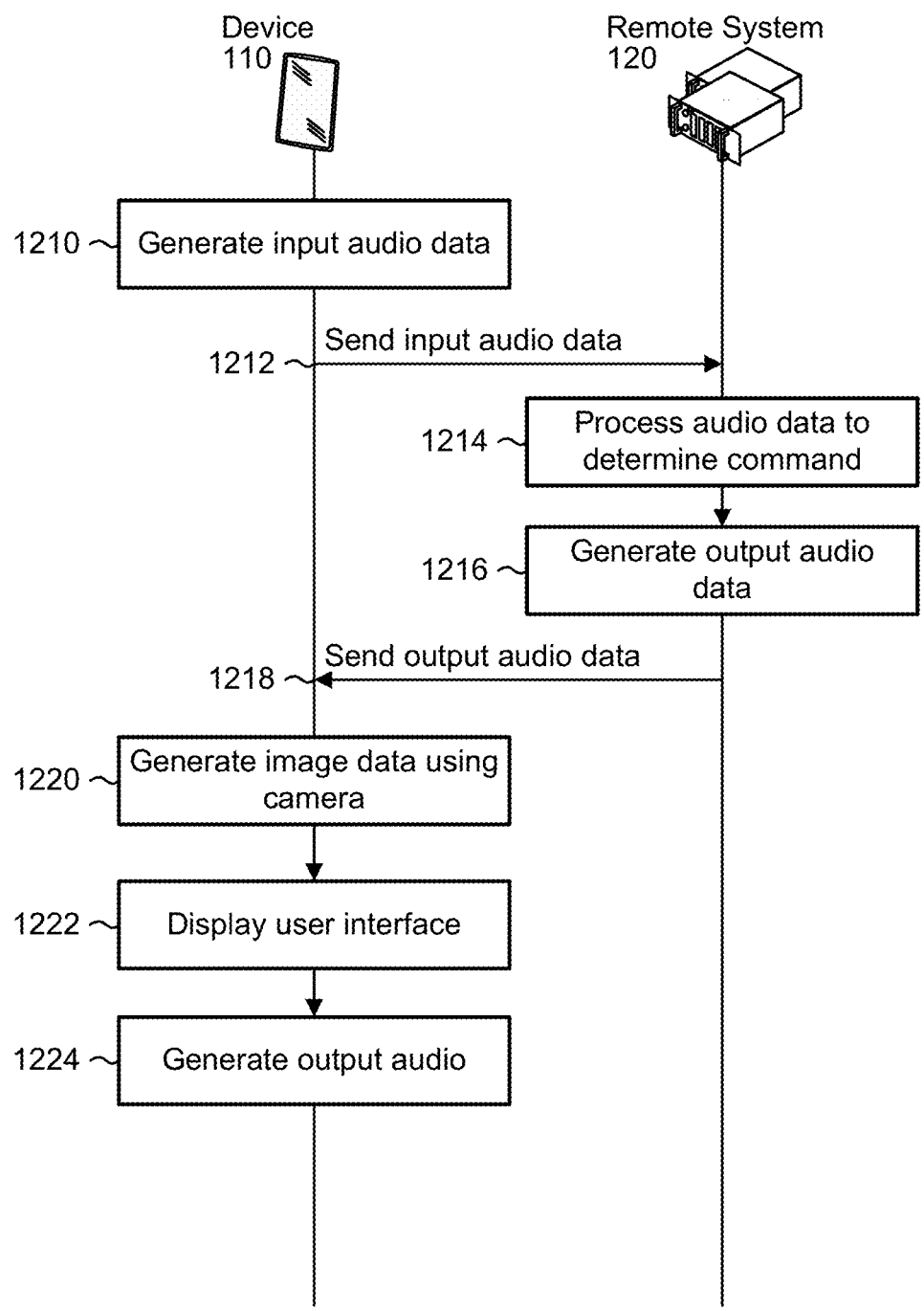

FIGS. 12A-12E are communication diagrams conceptually illustrating example methods for acquiring and displaying content according to embodiments of the present disclosure. As illustrated in FIG. 12A, the device 110 may generate (1210) input audio data and may send (1212) the input audio data to the remote system 120. For example, the input utterance may include a representation of an utterance generated by the user 5.

The remote system 120 may process (1214) the input audio data to determine a command corresponding to the utterance, may generate (1216) output audio data corresponding to the command, and may send (1218) the output audio data to the device 110. The device 110 may generate (1220) image data using the camera 118, may display (1222) a user interface based on the image data, and may generate (1224) output audio based on the output audio data received from the remote system 120. For example, the output audio data may include synthesized speech corresponding to a response to the utterance.

To illustrate an example, while displaying the user interface (e.g., displaying an image based on the image data, along with additional content overlaid on top of the image, such as labels and other graphical elements), the device 110 may receive the utterance from the user 5, which may correspond to a query requesting additional information about a specific feature. The device 110 may generate the input audio data including the representation of the utterance, may send the input audio data to the remote system 120, may receive the output audio data from the remote system 120 and may generate the output audio, which may correspond to the additional information about the specific feature.

Figure 12B:
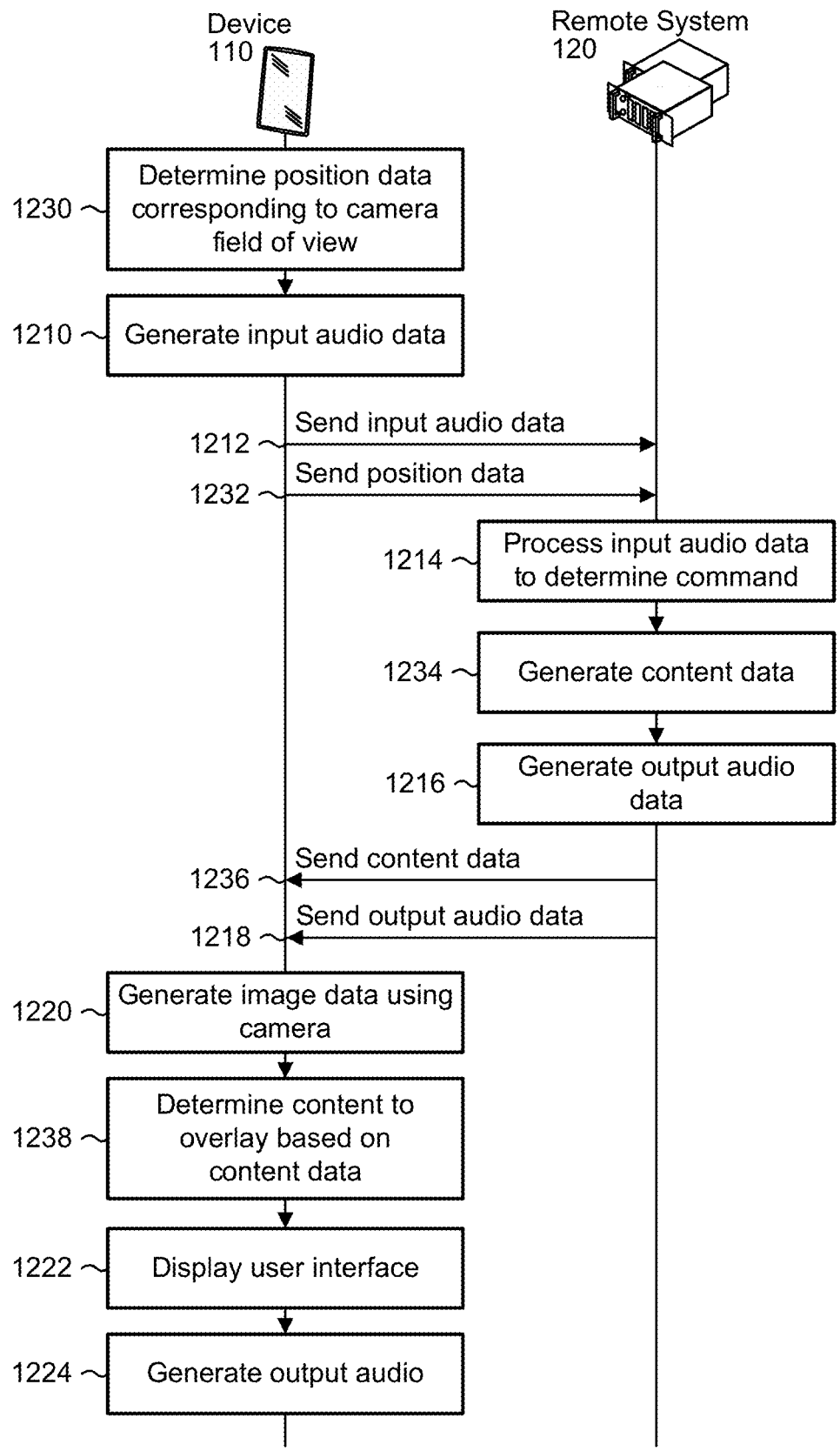

As illustrated in FIG. 12B, the device 110 may determine (1230) position data corresponding to the camera field of view, may generate (1210) the input audio data, may send (1212) the input audio data to the remote system 120, and may send (1232) the position data to the remote system 120. While FIG. 12B illustrates the device 110 sending the input audio data and the position data to the remote system 120 in two separate steps, the disclosure is not limited thereto and in some examples the device 110 may send the input audio data and the position data to the remote system 120 in a single step without departing from the disclosure.

The remote system 120 may process (1214) the input audio data to determine the command corresponding to the utterance, may generate (1234) content data corresponding to the content to display by the user interface, may generate (1216) the output audio data corresponding to the command and/or content data, may send (1236) the content data to the device 110, and may send (1218) the output audio data to the device 110.

The device 110 may generate (1220) the image data using the camera 118 and may determine (1238) the content to overlay based on the content data, as described in greater detail above with regard to FIG. 6. The device 110 may display (1222) the user interface based on the image data and the content data (e.g., present the content to display overlaid on top of the image represented in the image data), and may generate (1224) the output audio based on the output audio data received from the remote system 120.

As described in greater detail above with regard to FIG. 6, the remote system 120 may send references to the device 110 indicating content to display. For example, the references may correspond to local data stored on the device 110, which is illustrated in FIG. 12C, and/or remote data stored on third party server(s) 20, which is illustrated in FIGS. 12D-12E.

FIG. 12C illustrates an example of the remote system 120 sending a reference to local data to the device 110. For example, after generating the content data and the output audio data (e.g., illustrated as steps 1234 and 1216 in FIG. 12B), the remote system 120 may send (1240) content data to the device 110, which may include references to local data, and may send (1242) the output audio data to the device 110.

The device 110 may determine (1244) that the content data refers to local data (e.g., includes one or more references to local content data stored on the device 110), may retrieve (1246) the local data, may determine (1248) the content to overlay based on the local data, may generate (1250) image data using the camera 118, may display (1252) a user interface based on the local data and the image data, and may generate (1254) the output audio based on the output audio data. For example, the device 110 may present the content to display overlaid on top of the image represented in the image data while outputting the output audio using the loudspeaker(s) 116.

Figure 12D:
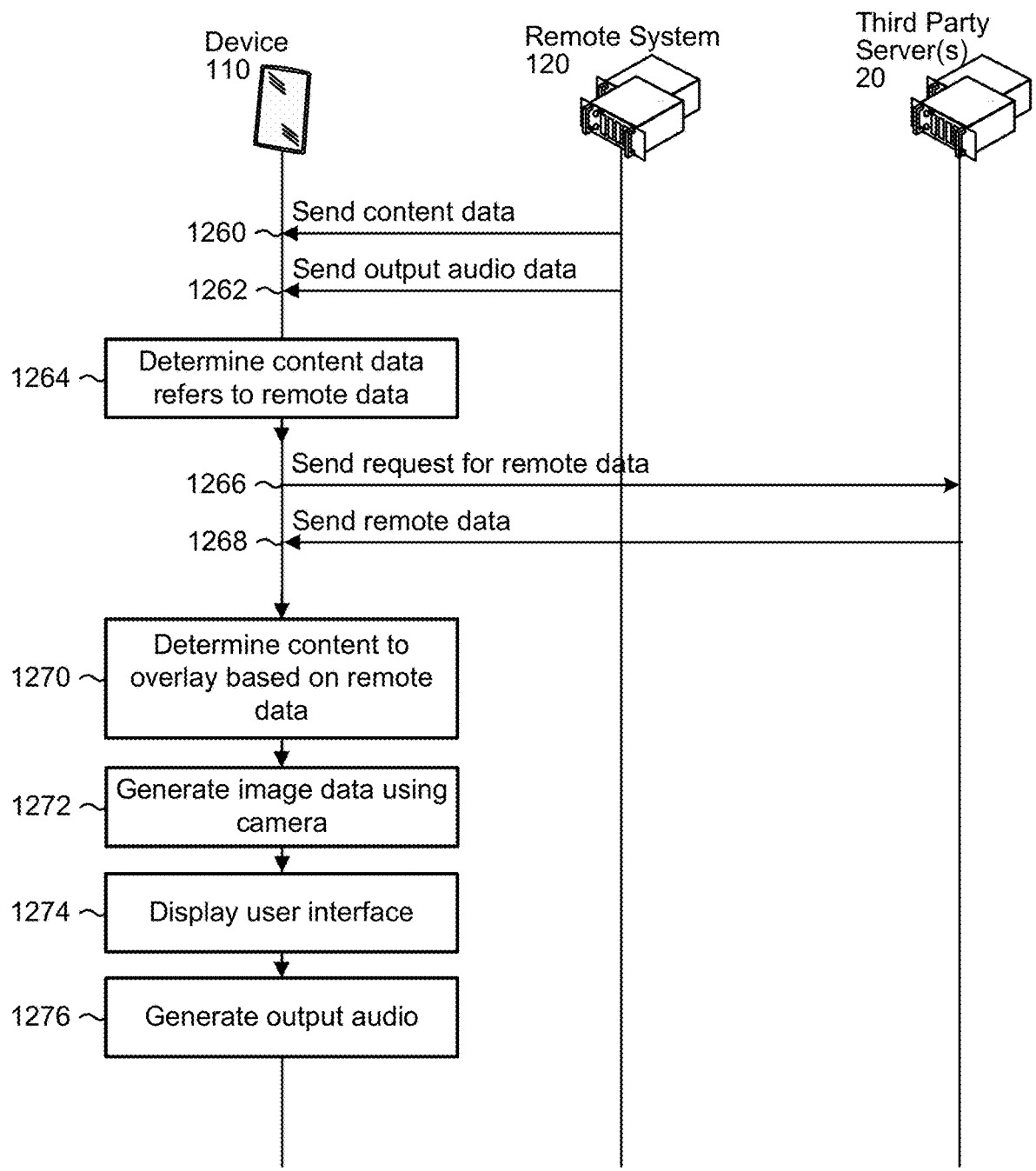
Figure 12E:
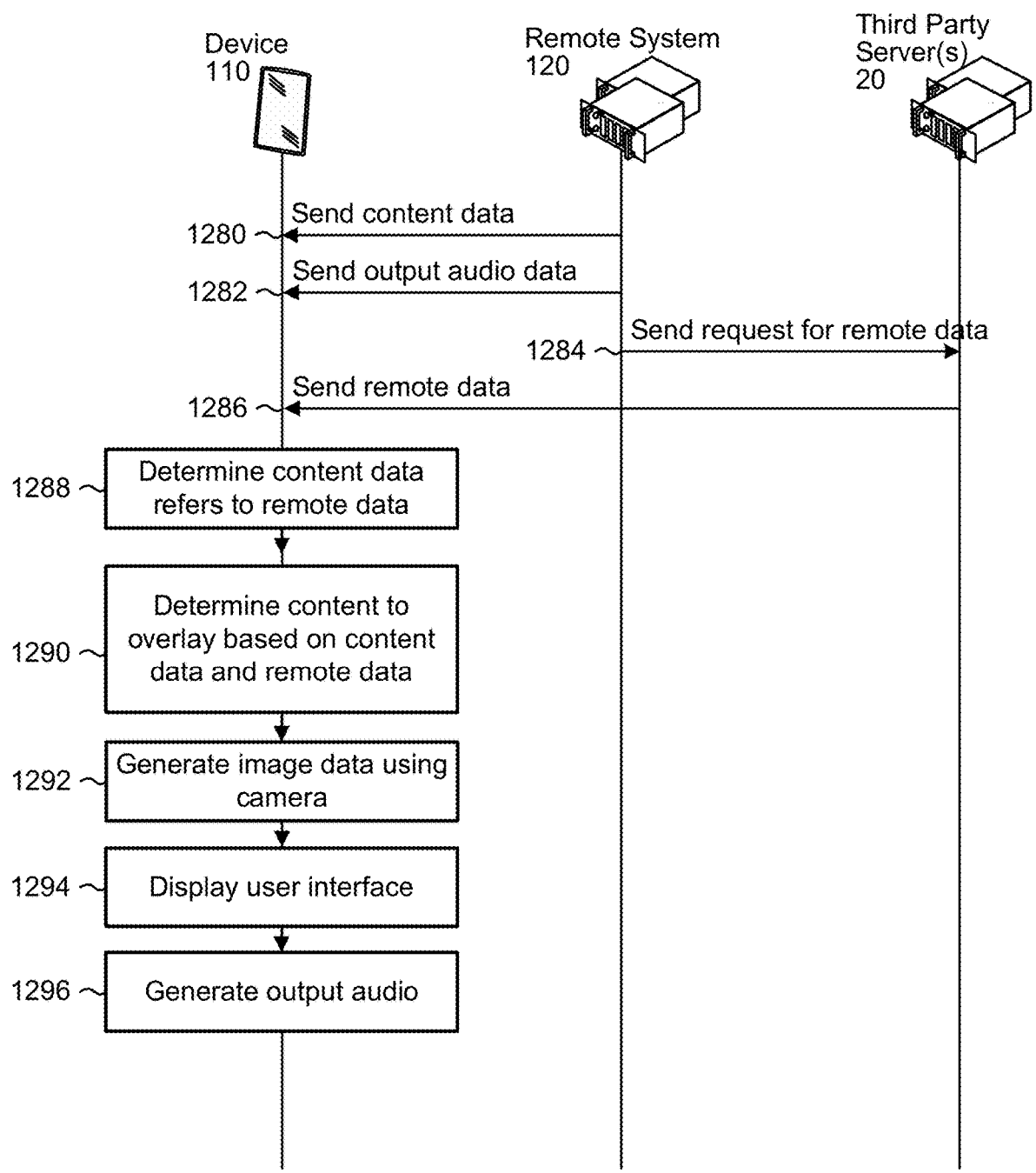

In contrast, FIG. 12D illustrates a first example of the remote system 120 sending a reference to remote data to the device 110. For example, after generating the content data and the output audio data (e.g., illustrated as steps 1234 and 1216 in FIG. 12B), the remote system 120 may send (1260) content data to the device 110, which may include references to remote data, and may send (1262) the output audio data to the device 110.

The device 110 may determine (1264) that the content data refers to remote data (e.g., includes one or more references to remote content data stored on the third party server(s) 20) and may send (1266) a request for the remote data to the third party server(s) 20. The third party server(s) 20 may receive the request and may send (1268) the remote data to the device 110. The device 110 may determine (1270) content to overlay based on the remote data, may generate (1272) image data using the camera 118, may display (1274) a user interface based on the remote data and the image data, and may generate (1276) the output audio based on the output audio data. For example, the device 110 may present the content to display overlaid on top of the image represented in the image data while outputting the output audio using the loudspeaker(s) 116.

While FIG. 12D illustrates the remote system 120 sending an instruction to the device 110 to request the remote data from the third party server(s) 20, the disclosure is not limited thereto. Instead, FIG. 12E illustrates a second example of the remote system 120 sending a reference to remote data to the device 110. For example, after generating the content data and the output audio data (e.g., illustrated as steps 1234 and 1216 in FIG. 12B), the remote system 120 may send (1280) content data to the device 110, which may include references to remote data, may send (1282) the output audio data to the device 110, and may send (1284) a request for the remote data to the third party server(s) 20.

The third party server(s) 20 may receive the request and may send (1286) the remote data to the device 110. The device 110 may determine (1288) that the content data refers to remote data (e.g., includes one or more references to remote content data stored on the third party server(s) 20) and may wait for the remote data. If the remote data does not arrive within a period of time, the device 110 may send a request for the remote data to the remote system 120 and/or the third party server(s) 20.

After receiving the remote data, the device 110 may determine (1290) content to overlay based on the remote data, may generate (1292) image data using the camera 118, may display (1294) a user interface based on the remote data and the image data, and may generate (1296) the output audio based on the output audio data. For example, the device 110 may present the content to display overlaid on top of the image represented in the image data while outputting the output audio using the loudspeaker(s) 116.

While FIGS. 12D-12E illustrate examples of the device 110 receiving remote data from the third party server(s) 20, the disclosure is not limited thereto and in some examples the device 110 and/or the remote system 120 may receive additional content from the vehicle 30 (e.g., from a remote device associated with the vehicle 30). For example, FIGS. 13A-13C illustrate examples of the vehicle 30 pushing content to the system 100 periodically, whereas FIGS. 14A-14D illustrate the system 100 requesting content from the vehicle 30 in response to voice commands.

Figure 13A:
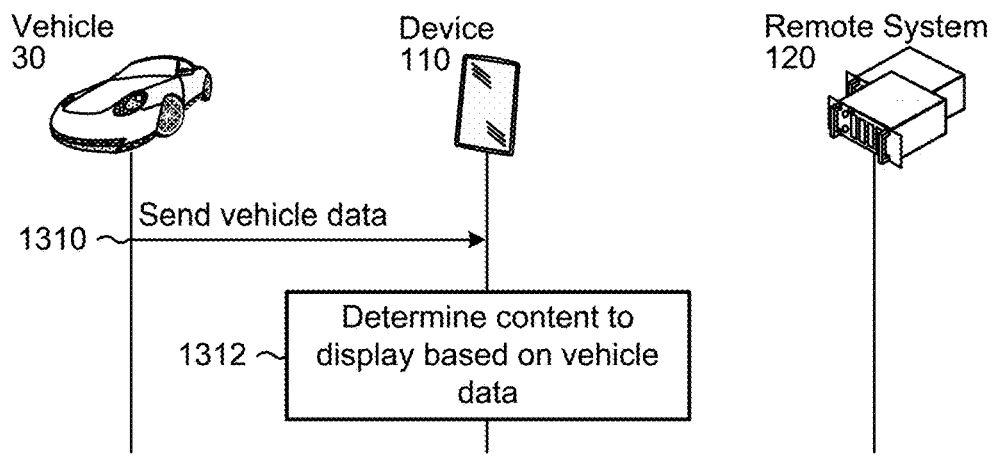
FIGS. 13A-13C are communication diagrams conceptually illustrating example methods for acquiring vehicle data according to embodiments of the present disclosure.
Figure 13B:
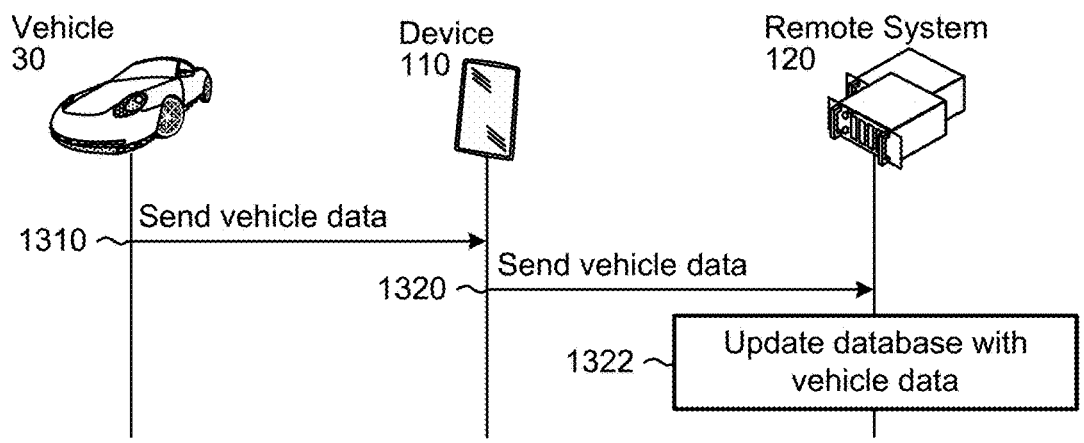
Figure 13C:
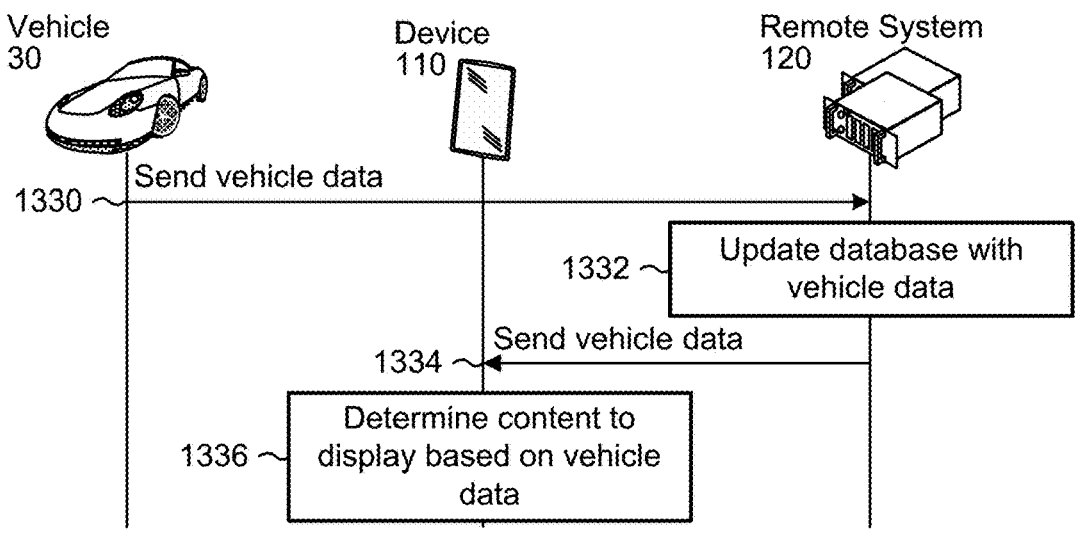

FIGS. 13A-13C are communication diagrams conceptually illustrating example methods for acquiring vehicle data according to embodiments of the present disclosure. As illustrated in FIG. 13A, the vehicle 30 may send (1310) vehicle data to the device 110 and the device 110 may determine (1312) content to display based on the vehicle data. For example, the device 110 may display information about the vehicle 30 within the user interface, such as a fuel efficiency (e.g., miles per gallon (MPG)), tire pressure data, and/or the like.

As illustrated in FIG. 13B, in some examples the vehicle 30 may send (1310) the vehicle data to the device 110, the device 110 may send (1320) the vehicle data to the remote system 120, and the remote system 120 may update (1322) a database with the vehicle data. For example, the remote system 120 may store the vehicle data in a user profile (e.g., track the vehicle data over a period of time), may update a knowledge base with the vehicle data, may update the knowledge base based on types of information included within the vehicle data (e.g., to enable the remote system 120 to determine which types of information is available in response to a voice command), and/or the like.

While not illustrated in FIG. 13B, the device 110 may perform step 1312 prior to performing step 1320. Thus, the device 110 may determine the content to display based on the vehicle data while also sending the vehicle data to the remote system 120.

While FIGS. 13A-13B illustrate the vehicle 30 sending the vehicle data directly to the device 110, the disclosure is not limited thereto. As illustrated in FIG. 13C, the vehicle 30 may send (1330) the vehicle data to the remote system 120, the remote system 120 may update (1332) the database with the vehicle data and may send (1334) the vehicle data to the device 110, and the device 110 may determine (1336) the content to display based on the vehicle data. In some examples, the remote system 120 may only send the vehicle data to the device 110 in response to a voice command requesting information associated with the vehicle data, although the disclosure is not limited thereto. For example, the vehicle 30 may send the vehicle data to the remote system 120 periodically and the remote system 120 may only send a portion of the vehicle data that is relevant to a current voice command received from the device 110.

FIGS. 14A-14D are communication diagrams conceptually illustrating example methods for acquiring and displaying vehicle data according to embodiments of the present disclosure. In contrast to the vehicle 30 sending the vehicle data to the system 100 periodically, as illustrated in FIGS. 13A-13C, FIGS. 14A-14D illustrate examples of the system 100 requesting the vehicle data from the vehicle 30 in response to a voice command.

Figure 14A:
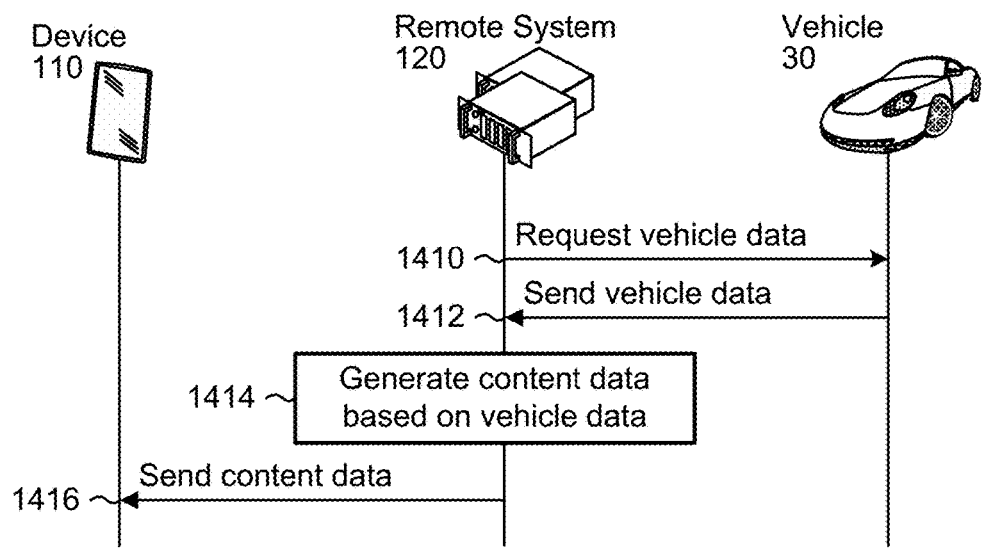

As illustrated in FIG. 14A, the remote system 120 may request (1410) vehicle data from the vehicle 30 (e.g., send a request to the vehicle 30 for the vehicle data) and the vehicle 30 may send (1412) the vehicle data to the remote system 120. The remote system 120 may generate (1414) content data based on the vehicle data and may send (1416) the content data to the device 110. For example, the remote system 120 may determine that a voice command requests specific information associated with the vehicle 30 and may request only vehicle data corresponding to the specific information from the vehicle 30. While not illustrated in FIG. 14A, the device 110 may determine content to overlay based on the content data and display a user interface based on the content data as described above with regard to FIGS. 12A-12E.

Figure 14B:
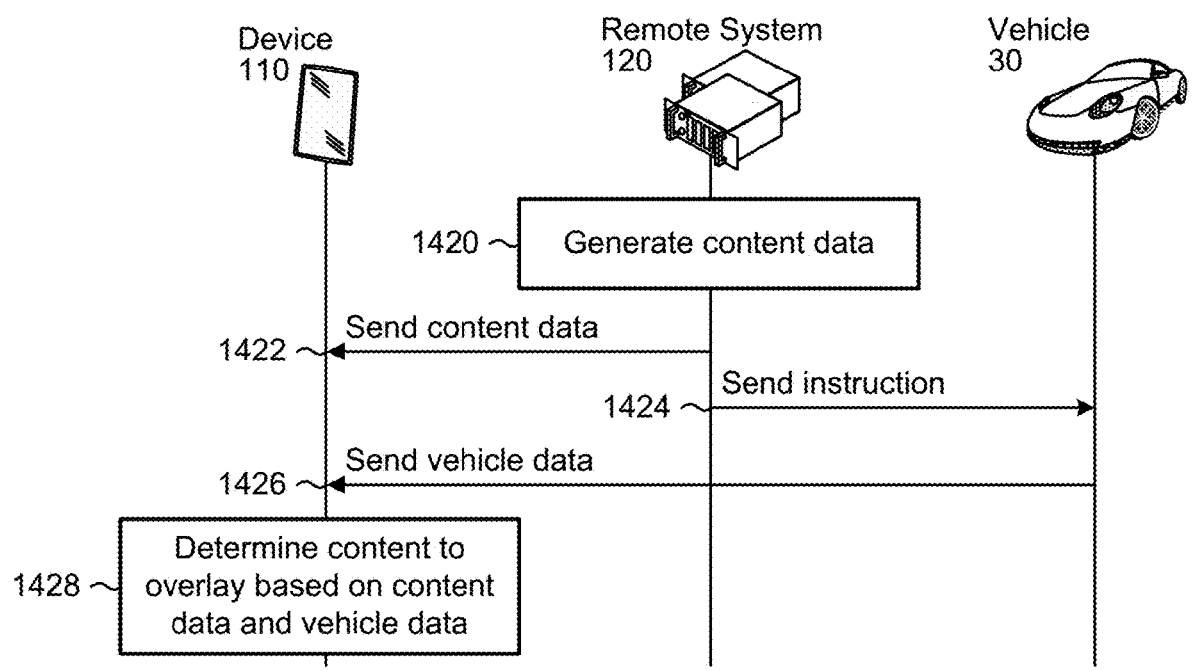

In contrast to the remote system 120 requesting the vehicle data prior to generating the content data, FIG. 14B illustrates an example in which the remote system 120 may generate (1420) content data, may send (1422) the content data to the device 110, and may send (1424) an instruction to the vehicle 30 including a command to send the vehicle data to the device 110. In response to receiving the instruction the vehicle 30 may send (1426) the vehicle data to the device 110 and the device 110 may determine (1428) content to overlay based on the content data and the vehicle data. While not illustrated in FIG. 14B, the device 110 may display a user interface based on the content data as described above with regard to FIGS. 12A-12E.

In some examples, the device 110 may communicate directly to the vehicle 30. As illustrated in FIG. 14C, the remote system 120 may generate (1420) the content data, may send (1450) the content data to the device 110, and may send (1452) an instruction to the device 110 including a command to request the vehicle data from the vehicle 30. The device 110 may determine (1454) that the instruction requests vehicle data and may request (1456) the vehicle data from the vehicle 30. In response to receiving the request, the vehicle 30 may send (1458) the vehicle data to the device 110 and the device 110 may determine (1460) content to overlay based on the content data and the vehicle data. While not illustrated in FIG. 14C, the device 110 may display a user interface based on the content data as described above with regard to FIGS. 12A-12E.

Figure 14D:
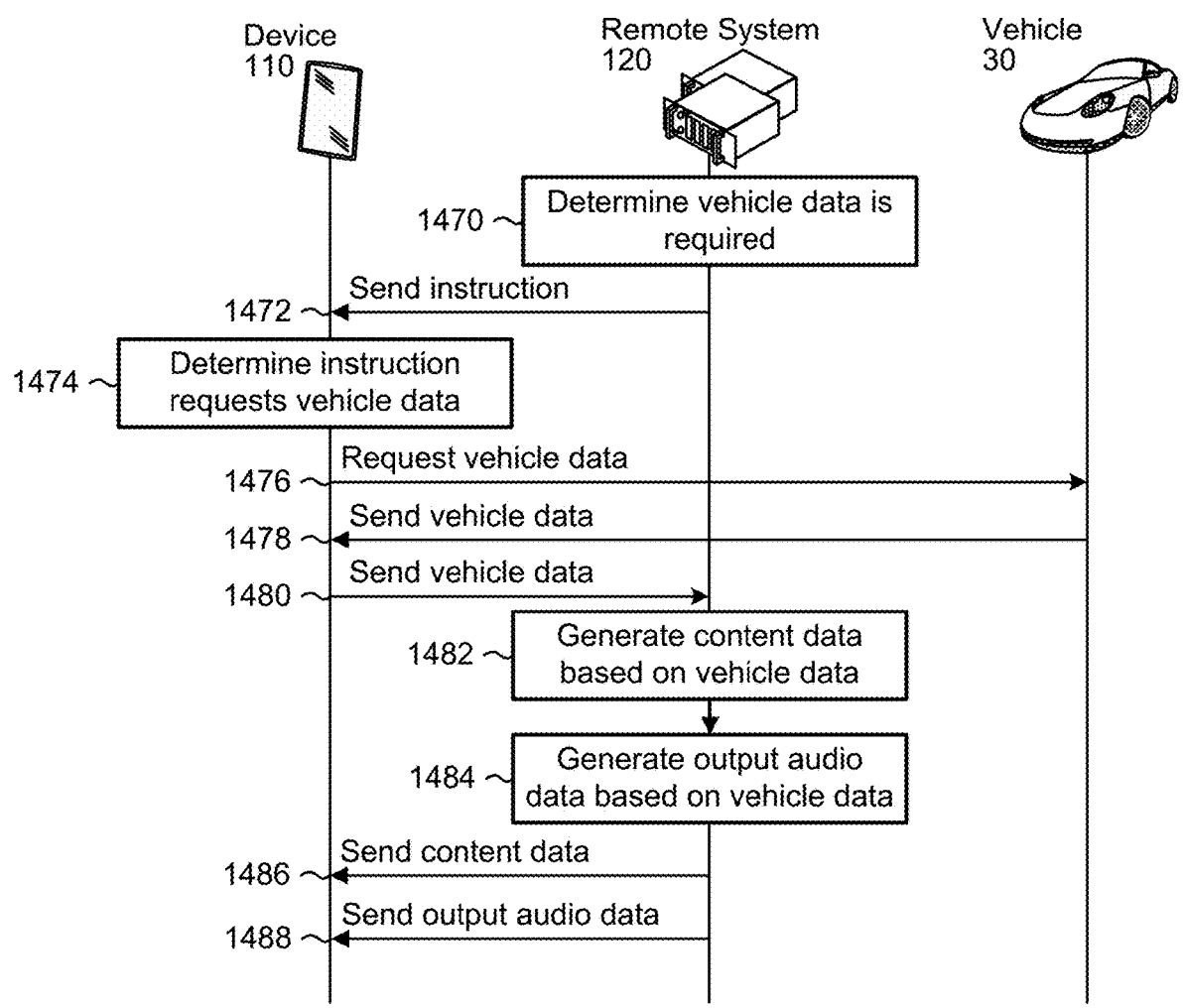

If the device 110 communicates directly with the vehicle 30 and not the remote system 120, in some examples the remote system 120 may request vehicle data prior to generating the content data. As illustrated in FIG. 14D, the remote system 120 may determine (1470) that vehicle data is required and may send (1472) an instruction to the device 110 including a command to request the vehicle data from the vehicle 30.

The device 110 may determine (1474) that the instruction requests vehicle data and may request (1476) the vehicle data from the vehicle 30. In response to receiving the request, the vehicle 30 may send (1478) the vehicle data to the device 110 and the device 110 may send (1480) the vehicle data to the remote system 120. Having acquired the vehicle data, the remote system 120 may generate (1482) content data based on the vehicle data, may generate (1484) output audio data based on the vehicle data, may send (1486) the content data to the device 110, and may send (1488) the output audio data to the device 110. While not illustrated in FIG. 14D, the device 110 may display a user interface based on the content data as described above with regard to FIGS. 12A-12E.

FIG. 15 illustrates an example of determining vehicle identification according to embodiments of the present disclosure. As described above, in order to provide information about the vehicle 30 to the user 5, the system 100 needs to specifically identify the vehicle 30. For example, the system 100 may require information about a manufacturer, a model, a model year, trim options, and/or the like in order to accurately describe specific features associated with the vehicle 30. This information is illustrated as vehicle identification 1550 in FIG. 15.

The system 100 may determine the vehicle identification 1550 using a variety of techniques, including retrieving the vehicle identification 1550 from a user profile 1510 associated with the device 110 and/or the user 5, based on input from the user 5 identifying the vehicle, and/or based on processing raw data generated by the device 110.

In some examples, the remote system 120 may access the vehicle identification 1550 based on the user profile 1510. For example, after determining the vehicle identification 1550 a first time, the remote system 120 may store the vehicle identification 1550 in the user profile 1510. Thus, if the user 5 owns two vehicles, the user profile 1510 may store first vehicle identification 1550a associated with a first vehicle and second vehicle identification 1550b associated with a second vehicle. Instead of having to determine the entire vehicle identification and/or specific information about the vehicle 30 each time, the system 100 may simply verify whether the vehicle 30 corresponds to either the first vehicle identification 1550a or the second vehicle identification 1550b. For example, if the first vehicle has a different manufacturer than the second vehicle, the system 100 may determine the manufacturer of the vehicle 30 and select either the first vehicle identification 1550a or the second vehicle identification 1550b based on the manufacturer.

As part of determining the vehicle identification 1550, the system 100 may display the selected vehicle identification 1550 using a user interface of the device 110. Thus, if the vehicle identification 1550 stored in the user profile 1510 is not associated with the current vehicle 30, the user 5 may provide input indicating that the selected vehicle identification 1550 is incorrect and/or inputting correct vehicle identification 1550. For example, the vehicle 30 may have the same manufacturer as one of the vehicles associated with the user profile 1510, but the model, model year, trim options, and/or the like may be incorrect. If the user 5 indicates that the vehicle identification 1550 is incorrect, the system 100 may determine new vehicle identification 1550 associated with the vehicle 30.

If the vehicle 30 is not associated with the user profile 1510, the system 100 may determine the vehicle identification 1550 based on input from the user 5. For example, the user 5 may identify the vehicle 30 in an utterance 1520, the device 110 may capture the utterance 1520 as audio data 1560 and may send the audio data 1560 to the remote system 120. Based on the audio data 1560, the remote system 120 may determine the vehicle identification 1550. Additionally or alternatively, the device 110 may display a user interface enabling the user 5 to select information associated with the vehicle 30, such as by displaying drop-down menus or the like, and the device 110 may determine the vehicle identification 1550. In some examples, the device 110 may enable the user 5 to input a vehicle identification number (VIN) associated with the vehicle 30 and the system 100 may determine the vehicle identification 1550 based on the VIN. For example, the device 110 may send text data 1570 including the VIN to the remote system 120 and the remote system 120 may determine the vehicle identification 1550.

While the examples described above refer to the system 100 determining the vehicle identification 1550 based on input from the user 5, the disclosure is not limited thereto. Instead, the system 100 may determine the vehicle identification 1550 based on other data received by the device 110. For example, the device 110 may capture an image of VIN 1530 or an image of an object associated with the vehicle 30 as image data 1562 and may send the image data 1562 to the remote system 120. The remote system 120 may process the image data 1562 using computer vision to determine the vehicle identification 1550. For example, the remote system 120 may identify the VIN number and/or identify specific objects within the vehicle 30 that may be used to determine the vehicle identification 1550 (e.g., symbol associated with the manufacturer and/or the model, layout of the cabin, dashboard, etc., other distinctive objects within the vehicle 30, and/or the like).

Additionally or alternatively, the device 110 may process the image data 1562 captured by the camera(s) 118 and generate feature data 1564, which corresponds to a model representing the image data 1562. Thus, the device 110 may send the feature data 1564 instead of and/or in addition to the image data 1562. For example, the feature data 1564 may correspond to a feature cloud representing a number of features from the image data 1562. The number of features may correspond to points of interest in the image data 1562, such that the feature data 1564 represents a model of the image data 1562 instead of an actual image. Thus, the feature data 1564 may indicate certain contrasts, geometric shapes (e.g., circle at a first position, square at a second position, etc.), other lower-level features (e.g., lines, shapes, etc.), and/or the like represented in a portion of the image data 1562. The remote system 120 may interpret the feature data 1564 to determine the vehicle identification 1550.

In some examples, the device 110 may generate additional context data 1572 based on an interaction with the vehicle 30 and/or a remote device associated with the vehicle 30. For example, the device 110 may receive Bluetooth data 1540 from the vehicle 30 and the system 100 may use the Bluetooth data 1540 to either a) select the vehicle identification 1550 from the user profile 1510 (e.g., if the Bluetooth 1540 data matches existing vehicle identification 1550) or b) determine at least a portion of the vehicle identification 1550. For example, the Bluetooth data 1540 may indicate information associated with the vehicle 30, such as a manufacturer and model. Using this information, the system 100 may request additional information from the user 5, may obtain the additional information based on the image data 1562 (e.g., detect distinctive features associated with a particular model year or trim option, for example), or the like. Additionally or alternatively, the device 110 may receive vehicle data 1542 from the vehicle 30 and/or the remote device. For example, the vehicle data 1542 may indicate the vehicle identification 1550 and/or may provide additional information with which the system 100 may determine the vehicle identification 1550.

While FIGS. 5A-15 illustrate examples of the device 110 interacting with a vehicle 30, the disclosure is not limited thereto and the device 110 may interact with any object using techniques similar to the examples described above. For example, the system 100 may determine an identification of an object, may retrieve information specific to the object, and may process voice commands and/or generate a user interface based on the specific information associated with the object without departing from the disclosure.

Figure 16:
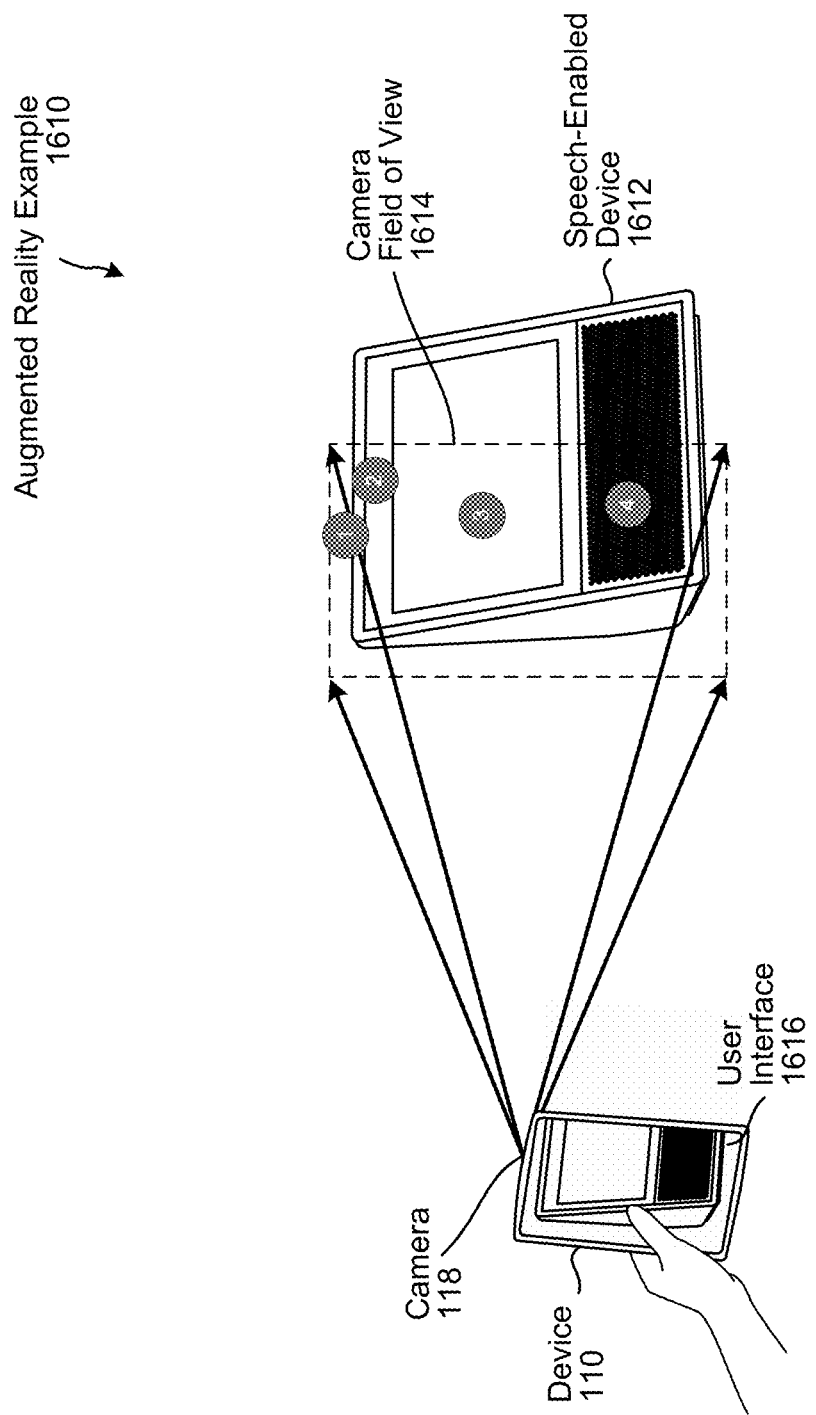
FIG. 16 illustrates an example of an augmented reality user interface according to embodiments of the present disclosure.

FIG. 16 illustrates an example of an augmented reality user interface according to embodiments of the present disclosure. As illustrated in FIG. 16, an augmented reality example 1610 may correspond to products and/or objects other than vehicles, such as a speech-enabled device 1612. For example, the device 110 may capture a camera field of view 1614 representing at least a portion of the speech-enabled device 1612 and display a user interface 1616 that includes additional information about the speech-enabled device 1612 overlaid on top of an image. As illustrated in FIG. 16, the user interface 1616 may present four features of the speech-enabled device 1612, such as identifying a location of microphones, a camera, a display, and loudspeakers of the speech-enabled device 1612. Based on user input selecting one of the features, the device 110 may display additional information about the selected feature using techniques similar to those described above. Thus, the device 110 may enable an augmented reality user interface for a variety of products without departing from the disclosure.

Figure 17:
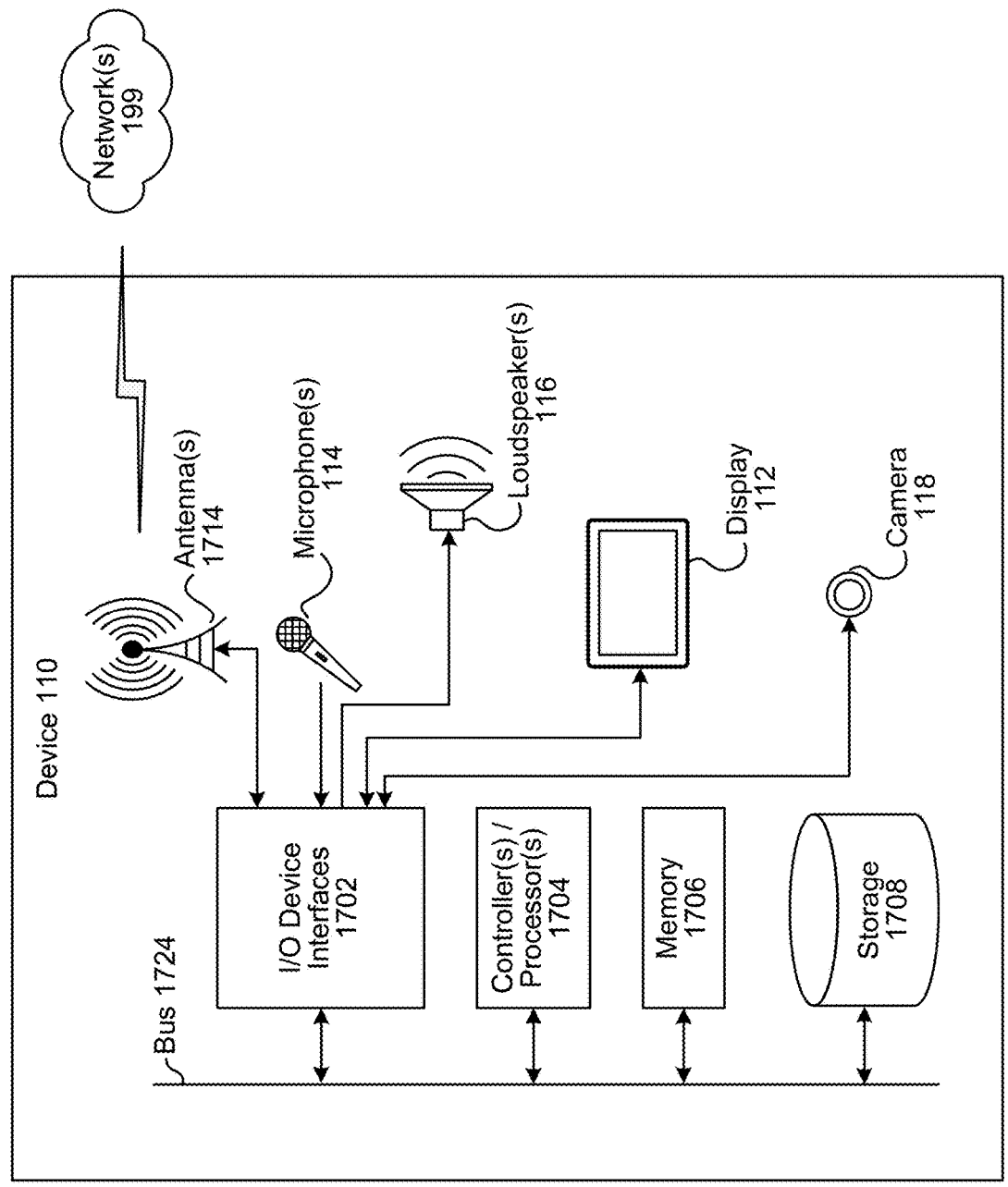
FIG. 17 is a block diagram conceptually illustrating example components of a device according to embodiments of the present disclosure.

FIG. 17 is a block diagram conceptually illustrating a user device 110 that may be used with the system. FIG. 18 is a block diagram conceptually illustrating example components of a remote device, such as remote server(s) 1820 included in the remote system 120, which may assist with ASR processing, NLU processing, SLU processing and/or command processing. Multiple remote servers 1820 may be included in the remote system 120, such as one or more servers for performing ASR, one or more remote servers 1820 for performing NLU, etc. In operation, each of these devices (or groups of devices) may include computer-readable and computer-executable instructions that reside on the respective device (110/1820), as will be discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/1820) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/1820) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/1820) may also be connected to removable or external non-volatile memory and/or storage (such as a removable memory card, memory key drive, networked storage, etc.) through respective input/output device interfaces (1702/1802).

Computer instructions for operating each device (110/1820) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/1820) includes input/output device interfaces (1702/1802). A variety of components may be connected through the input/output device interfaces (1702/1802), as will be discussed further below. Additionally, each device (110/1820) may include an address/data bus (1724/1824) for conveying data among components of the respective device. Each component within a device (110/1820) may also be directly connected to other components in addition to (or instead of) being connected to other components across the bus (1724/1824).

Referring to FIG. 17, the device 110 may include input/output device interfaces 1702 that connect to a variety of components such as an audio output component such as loudspeaker(s) 116, a speaker (not illustrated), a wired headset or a wireless headset (not illustrated), or other component capable of outputting audio. The device 110 may also include an audio capture component. The audio capture component may be, for example, one or more microphone(s) 114 or an array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 112 for displaying content and/or a camera 118 for generating image data, although the disclosure is not limited thereto.

Via antenna(s) 1714, the input/output device interfaces 1702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1702/1802) may also include communication components that allow data to be exchanged between devices such as different physical servers in a collection of servers or other components.

The components of the device(s) 110 and the remote system 120 may include their own dedicated processors, memory, and/or storage. Alternatively, one or more of the components of the device(s) 110 and the remote system 120 may utilize the I/O interfaces (1702/1802), processor(s) (1704/1804), memory (1706/1806), and/or storage (1708/1808) of the device(s) 110 and remote system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the remote system 120, as described herein, are exemplary, and may be located as a stand-alone device or may be included, in whole or in part, as a component of a larger device or system.

As illustrated in FIG. 19, multiple devices (110a-110e, 120, 125) may contain components of the system 100 and the devices may be connected over network(s) 199. The network(s) 199 may include a local or private network or may include a wide network such as the Internet. Devices may be connected to the network(s) 199 through either wired or wireless connections. For example, a display device 110a, a smartphone 110b, a smart watch 110c, a tablet computer 110d, a smart television 110e, and/or a vehicle 30 may be connected each other and/or to the network(s) 199 through a wireless service provider, over a WiFi or cellular network connection, or the like. Other devices are included as network-connected support devices, such as the remote system 120, skill server(s) 125, third party server(s) 20, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more remote servers 1820.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
receiving, by a smartphone from an image sensor of the smartphone, first image data representing at least a first portion of a vehicle;

presenting, on a display of the smartphone, a first image that corresponds to the first image data;
receiving, by the smartphone, a user input specifying vehicle data corresponding to at least one of a manufacturer, model, or model year of the vehicle;
sending, from the smartphone to a remote system, the vehicle data;
generating, using a microphone of the smartphone, input audio data representing an utterance;
sending, from the smartphone to the remote system, the input audio data for speech processing;
processing, by the remote system, the input audio data to determine a voice command;
determining, by the remote system, that the voice command is requesting information about an object included in the vehicle;
generating, by the remote system using the vehicle data, response data including information about the object;
generating, by the remote system using the response data, output audio data including synthesized speech representing the information about the object;
sending, from the remote system to the smartphone, the output audio data;
receiving, by the smartphone from the image sensor, second image data;
determining, by the smartphone, a first position of a representation of the object within the second image data;
determining, by the smartphone, label data identifying the object;
presenting, on the display using the second image data, a second image representing a label based on the label data at the first position; and
generating, by the smartphone while presenting the second image, output audio based on the output audio data.

2. The computer-implemented method of claim 1, further comprising, by the smartphone:
determining a first location of the object within the vehicle;
receiving, from the image sensor, third image data;
determining a field of view of the third image data;
determining, using the first location, that the object is outside the field of view;
determining a second location within the vehicle corresponding to the field of view;
determining a direction of the first location relative to the second location; and
presenting, on the display using the third image data, a third image representing the field of view and a visual effect indicating the direction.

3. The computer-implemented method of claim 1, further comprising:
determining, by the smartphone, prior to generating the input audio data, a field of view of the first image data;
determining, by the smartphone, that the object is represented within the field of view;
determining, by the smartphone, the label data corresponding to the object;
sending, by the smartphone to the remote system, in response to generating the input audio data, position data indicating at least the label data;
determining, by the remote system using the position data, that the label data is associated with the input audio data; and
identifying, by the remote system using the label data, one or more entities corresponding to the object, wherein:

determining that the voice command is requesting information about the object further comprises detecting a representation of at least one of the one or more entities in the input audio data, and
generating the response data further comprises identifying the information about the object using the label data.

4. The computer-implemented method of claim 1, wherein presenting the second image further comprises:
determining that the response data indicates the object;
determining that the object is represented in a first area within the second image data;
determining a second position of a center of the first area;
determining that the object is outside a second area within the second image data; and
presenting, on the display using the second image data, the second image representing the label at the first position, a visual effect emphasizing the first area, and the information about the object within the second area.

5. A computer-implemented method, the method comprising:
receiving, from an image sensor associated with a first device, first image data representing at least a portion of a second device;
presenting, on a display of the first device, a first image based on the first image data;
receiving, by the first device, first audio data representing an utterance;
sending, to a remote system, the first audio data;
receiving, from the remote system, first data corresponding to the second device;
determining that the first data indicates a first part of the second device;
determining a first location associated with the first part;
receiving, from the image sensor, second image data;
determining, based on the first location, that the first part is outside a first field of view associated with the second image data;
determining a second location associated with the second image data;
determining a direction of the first location relative to the second location;
generating a first visual effect indicating the direction; and
presenting, on the display, a second image based on the second image data and the first visual effect.

6. The computer-implemented method of claim 5, further comprising:
receiving, from the image sensor, third image data;
determining that the first part is represented in a first area within the third image data;
generating a second visual effect emphasizing the first area; and
presenting, on the display, a third image based on the third image data and the second visual effect.

7. The computer-implemented method of claim 5, further comprising:
determining, prior to receiving the first audio data, a second field of view associated with the first image data;
determining that a second part of the second device is represented within the second field of view;
determining label data associated with the second part; and
sending, to the remote system the label data, wherein the remote system processes the first audio data based on the label data.

8. The computer-implemented method of claim 5, further comprising:
  determining, prior to receiving the first audio data, a second field of view associated with the first image data;
  determining coordinate data corresponding to coordinates associated with the second field of view; and
  sending, to the remote system the coordinate data, wherein the remote system processes the first audio data based on the coordinate data.

9. The computer-implemented method of claim 5, further comprising:
  determining second data identifying the second device;
  sending, to the remote system, the second data; and
  sending, to the remote system, indication data indicating that the first image was presented while at least a portion of the utterance was spoken.

10. The computer-implemented method of claim 5, further comprising:
  determining that the first data includes a first portion of content to display;
  determining that the first data includes a reference to a second portion of the content;
  identifying, based on the reference, the second portion of the content;
  receiving, from the image sensor, third image data;
  determining that the first part is represented in a first area within the third image data;
  determining that the first part is outside a second area within the third image data; and
  presenting, on the display, a third image based on the third image data and the content to display, the third image representing the first part within the first area and the content within the second area.

11. A system comprising:
  at least one processor; and
  memory including instructions operable to be executed by the at least one processor to cause the system to:
    receive, from a first device, first audio data representing an utterance;
    receive, from the first device, position data indicating that a first part of a second device is represented in first image data that was presented while at least a portion of the utterance was spoken, the position data indicating at least one of a plurality of labels associated with the second device;
    determine that the first audio data is associated with the second device;
    determine, using the position data, first data associated with the second device, the first data corresponding to information about the second device;
    process, based on the first data, the first audio data to determine a voice command;
    generate, based on the first data and the voice command, response data; and
    send the response data to the first device.

12. The system of claim 11, wherein the memory further comprises instructions that, when executed by the at least one processor, further cause the system to:
  receive, from the first device, position data indicating coordinates associated with the first image data;
  determine a second part of the second device, wherein determining the second part is based on the first data, the position data, and the voice command; and
  generate, based on the first data and the second part of the second device, the response data.

13. The system of claim 11, wherein the memory further comprises instructions that, when executed by the at least one processor, further cause the system to:
  determine a second part of the second device, wherein determining the second part is based on the position data, the first data, and the voice command; and
  generate, based on the first data and the second part of the second device, the response data.

14. The system of claim 11, wherein the memory further comprises instructions that, when executed by the at least one processor, further cause the system to:
  determine, based at least in part on the position data, that a portion of the second device was presented, by a display screen associated with the first device, when the portion of the utterance was spoken;
  determine, using a first domain, the first data including first entity data representing one or more entities associated with the portion of the second device;
  determine, based at least in part on the first audio data and the first entity data, a first NLU hypothesis corresponding to the voice command, the first NLU hypothesis being associated with the first domain; and
  generate, based at least in part on the first NLU hypothesis and the first data, the response data.

15. The system of claim 11, wherein the memory further comprises instructions that, when executed by the at least one processor, further cause the system to:
  receive, from the first device, identification data that identifies the second device;
  determine a first domain associated with the identification data;
  receive, from the first domain, the first data including first entity data representing one or more entities associated with the second device;
  determine, based at least in part on the first audio data and the first entity data, a first NLU hypothesis corresponding to the voice command, the first NLU hypothesis being associated with the first domain; and
  generate, based at least in part on the first NLU hypothesis and the first data, the response data.

16. The system of claim 11, wherein the memory further comprises instructions that, when executed by the at least one processor, further cause the system to:
  receive, from the first device, second image data associated with the second device;
  identify, based on the second image data, a manufacturer of the second device;
  identify, based on the second image data, a model of the second device;
  identify, based on the second image data, a model year of the second device;
  determine the first data based on the manufacturer, the model, and the model year, wherein the first data includes first entity data representing one or more entities associated with the second device;
  determine, based at least in part on the first audio data and the first entity data, a first NLU hypothesis corresponding to the voice command; and
  generate, based at least in part on the first NLU hypothesis and the first data, the response data.

17. The system of claim 11, wherein the memory further comprises instructions that, when executed by the at least one processor, further cause the system to:
  receive the first image data that was presented, by a display screen associated with the first device, while at least the portion of the utterance was spoken;

determine that the first image data represents a portion of the second device;
determine first entity data representing one or more entities associated with the portion of the second device;
determine, based at least in part on the first audio data and the first entity data, a first NLU hypothesis corresponding to the voice command; and
generate, based at least in part on the first NLU hypothesis and the first data, the response data.

18. The system of claim 11, wherein the memory further comprises instructions that, when executed by the at least one processor, further cause the system to:
determine, using the position data, that first content was presented, by a display screen associated with the first device, while at least the portion of the utterance was spoken;
determine a first domain associated with the first content;
receive, from the first domain, the first data including first entity data representing one or more entities associated with the second device;
determine, based at least in part on the first audio data and the first entity data, a first NLU hypothesis corresponding to the voice command, the first NLU hypothesis being associated with the first domain; and
generate, based at least in part on the first NLU hypothesis and the first data, the response data.

19. The system of claim 11, wherein the memory further comprises instructions that, when executed by the at least one processor, further cause the system to:
determine, using the position data, that first content was presented, by a display screen associated with the first device, while at least the portion of the utterance was spoken;
determine a first domain associated with the first content;
determine, using the first audio data, a first plurality of NLU hypotheses associated with the utterance;
receive, from the first domain, the first data including first entity data representing one or more entities associated with the second device;
select, from the first plurality of NLU hypotheses, a first NLU hypothesis as being associated with the utterance based, at least in part, on the first entity data; and
generate, using the first domain, the response data based on the first NLU hypothesis.

20. The system of claim 11, wherein the memory further comprises instructions that, when executed by the at least one processor, further cause the system to:
receive the position data, the position data including a first identifier corresponding to a first label of the plurality of labels; and
determine, using the first identifier and an index associated with the second device, the first part of the second device and a first location associated with the first part.

21. A computer-implemented method, the method comprising:
receiving, from an image sensor associated with a first device, first image data representing at least a portion of a second device;
presenting, on a display of the first device, a first image based on the first image data;
determining a first field of view associated with the first image data;
determining that a first part of the second device is represented within the first field of view;
determining label data associated with the first part;
receiving, by the first device, first audio data representing an utterance;
sending, to a remote system, the first audio data;
sending, to the remote system in response to receiving the first audio data, position data indicating at least the label data, wherein the remote system processes the first audio data based on the position data;
receiving, from the remote system, first data corresponding to the second device;
determining, based on the first data, content to display;
receiving, from the image sensor, second image data; and
presenting, on the display, a second image based on the second image data and the content to display.

22. A computer-implemented method, the method comprising:
receiving, from an image sensor associated with a first device, first image data representing at least a portion of a second device;
presenting, on a display of the first device, a first image based on the first image data;
receiving, by the first device, first audio data representing an utterance;
sending, to a remote system, the first audio data;
receiving, from the remote system, first data corresponding to the second device;
determining that the first data indicates a first part of the second device;
determining that the first data includes a first portion of content to display;
determining that the first data includes a reference to a second portion of the content;
identifying, based on the reference, the second portion of the content;
receiving, from the image sensor, second image data;
determining that the first part is represented in a first area within the second image data;
determining that the first part is outside a second area within the second image data; and
presenting, on the display, a second image based on the second image data and the content to display, the second image representing the first part within the first area and the content within the second area.

* * * * *